United States Patent [19]
Seto

[11] Patent Number: 5,304,988
[45] Date of Patent: Apr. 19, 1994

[54] CHARACTER PROCESSING METHOD
[75] Inventor: Kunio Seto, Inagi, Japan
[73] Assignee: Canon Kabushiki Kaisha, Tokyo, Japan
[21] Appl. No.: 739,993
[22] Filed: Aug. 2, 1991
[30] Foreign Application Priority Data Aug. 3, 1990 [JP] Japan ................... 2-206621

[51] Int. Cl.$^5$ ............................... G09G 1/14
[52] U.S. Cl. .................... 341/141; 382/22; 395/143
[58] Field of Search ............... 382/21, 22; 340/748, 340/731; 395/141, 143

[56] References Cited
FOREIGN PATENT DOCUMENTS 2638264  4/1990  France ............ G06K 9/00
2224420  5/1990  United Kingdom .
8704835  8/1987  World Int. Prop. O. .... G09G 1/44

Primary Examiner—Leo H. Boudreau
Attorney, Agent, or Firm—Fitzpatrick, Cella, Harper & Scinto

[57] ABSTRACT

A character processing apparatus for recognizing coordinate information expressing a character, an exterior outline, an interior outline, a horizontal line and a vertical line; classifying the coordinate information expressing a character, the exterior outline, the interior outline, the horizontal line and the vertical line, and then determining a pair of the horizontal line and the vertical line; and setting a skipping order at the time of a low pixel so as to be converted into character data for a bit map development composed of a control point coordinate for expressing the outline of the subject character, band information and coordinate value information about the control point which is not included in the band information.

2 Claims, 35 Drawing Sheets

FIG. 4A

| CONTROL POINTS | | | |
|---|---|---|---|
| P | X | Y | C |
| p0 | x0 | y0 | c0 |
| p1 | x1 | y1 | c1 |
| p2 | x2 | y2 | c2 |
| p3 | x3 | y3 | c3 |
| p4 | x4 | y4 | c4 |
| p5 | x5 | y5 | c5 |
| p6 | x6 | y6 | c6 |
| p7 | x7 | y7 | c7 |
| p8 | x8 | y8 | c8 |
| p9 | x9 | y9 | c9 |
| p10 | x10 | y10 | c10 |
| p11 | x11 | y11 | c11 |
| p12 | x12 | y12 | c12 |
| p13 | x13 | y13 | c13 |
| p14 | x14 | y14 | c14 |
| p15 | x15 | y15 | c15 |
| p16 | x16 | y16 | c16 |
| p17 | x17 | y17 | c17 |
| p18 | x18 | y18 | c18 |
| p19 | x19 | y19 | c19 |
| p20 | x20 | y20 | c20 |
| p21 | x21 | y21 | c21 |
| p22 | x22 | y22 | c22 |
| p23 | x23 | y23 | c23 |
| p24 | x24 | y24 | c24 |
| p25 | x25 | y25 | c25 |
| p26 | x26 | y26 | c26 |
| p27 | x27 | y27 | c27 |
| p28 | x28 | y28 | c28 |
| p29 | x29 | y29 | c29 | t0 ⇒ p0 row; t1 ⇒ p19 row; t2 ⇒ p25 row; t3 ⇒ p129 row

| P | X | Y | C |
|---|---|---|---|
| p100 | x100 | y100 | c100 |
| p101 | x101 | y101 | c101 |
| p102 | x102 | y102 | c102 |
| p103 | x103 | y103 | c103 |
| p104 | x104 | y104 | c104 |
| p105 | x105 | y105 | c105 |
| p106 | x106 | y106 | c106 |
| p107 | x107 | y107 | c107 |
| p108 | x108 | y108 | c108 |
| p109 | x109 | y109 | c109 |
| p110 | x110 | y110 | c110 |
| p111 | x111 | y111 | c111 |
| p112 | x112 | y112 | c112 |
| p113 | x113 | y113 | c113 |
| p114 | x114 | y114 | c114 |
| p115 | x115 | y115 | cl115 |
| p116 | x116 | y116 | c116 |
| p117 | x117 | y117 | c117 |
| p118 | x118 | y118 | c18 |
| p119 | x119 | y119 | c119 |
| p120 | x120 | y120 | c120 |
| p121 | x121 | y121 | c121 |
| p122 | x122 | y122 | c122 |
| p123 | x123 | y123 | c123 |
| p124 | x124 | y124 | c124 |
| p125 | x125 | y125 | c125 |
| p126 | x126 | y126 | c126 |
| p127 | x127 | y127 | c127 |
| p128 | x128 | y128 | c128 |
| p129 | x129 | y129 | c129 | t4 ⇒ p133; t5 ⇒ p137; t6 ⇒ p141; t7 ⇒ p145; t8 ⇒ p149; t9 ⇒ p153

| P | X | Y | C |
|---|---|---|---|
| p130 | x130 | y130 | c130 |
| p131 | x131 | y131 | c131 |
| p132 | x132 | y132 | c132 |
| p133 | x133 | y133 | c133 |
| p134 | x134 | y134 | c134 |
| p135 | x135 | y135 | c135 |
| p136 | x136 | y136 | c136 |
| p137 | x137 | y137 | c137 |
| p138 | x138 | y138 | c138 |
| p139 | x139 | y139 | c139 |
| p140 | x140 | y140 | c140 |
| p141 | x141 | y141 | c141 |
| p142 | x142 | y142 | c142 |
| p143 | x143 | y143 | c143 |
| p144 | x144 | y144 | c144 |
| p145 | x145 | y145 | c145 |
| p146 | x146 | y146 | c146 |
| p147 | x147 | y147 | c147 |
| p148 | x148 | y148 | c148 |
| p149 | x149 | y149 | c149 |
| p150 | x150 | y150 | c150 |
| p151 | x151 | y151 | c151 |
| p152 | x152 | y152 | c152 |
| p153 | x153 | y153 | 153c |
| p154 | x154 | y154 | c154 |
| p155 | x155 | y155 | c155 |
| p156 | x156 | y156 | c156 |

FIG. 4B

| OUTLINE DATA | | |
|---|---|---|
| NO OF CP | | |
| nt | | |
| t0 | p0 | p118 |
| t1 | p119 | p124 |
| t2 | p125 | p128 |
| t3 | p129 | p132 |
| t4 | p133 | p136 |
| t5 | p137 | p140 |
| t6 | p141 | p144 |
| t7 | p145 | p148 |
| t8 | p149 | p152 |
| t9 | p153 | p156 |

| CHR SHAPE DATA | | |
|---|---|---|
| min_p | x103 | y12 |
| max_p | x60 | y96 |

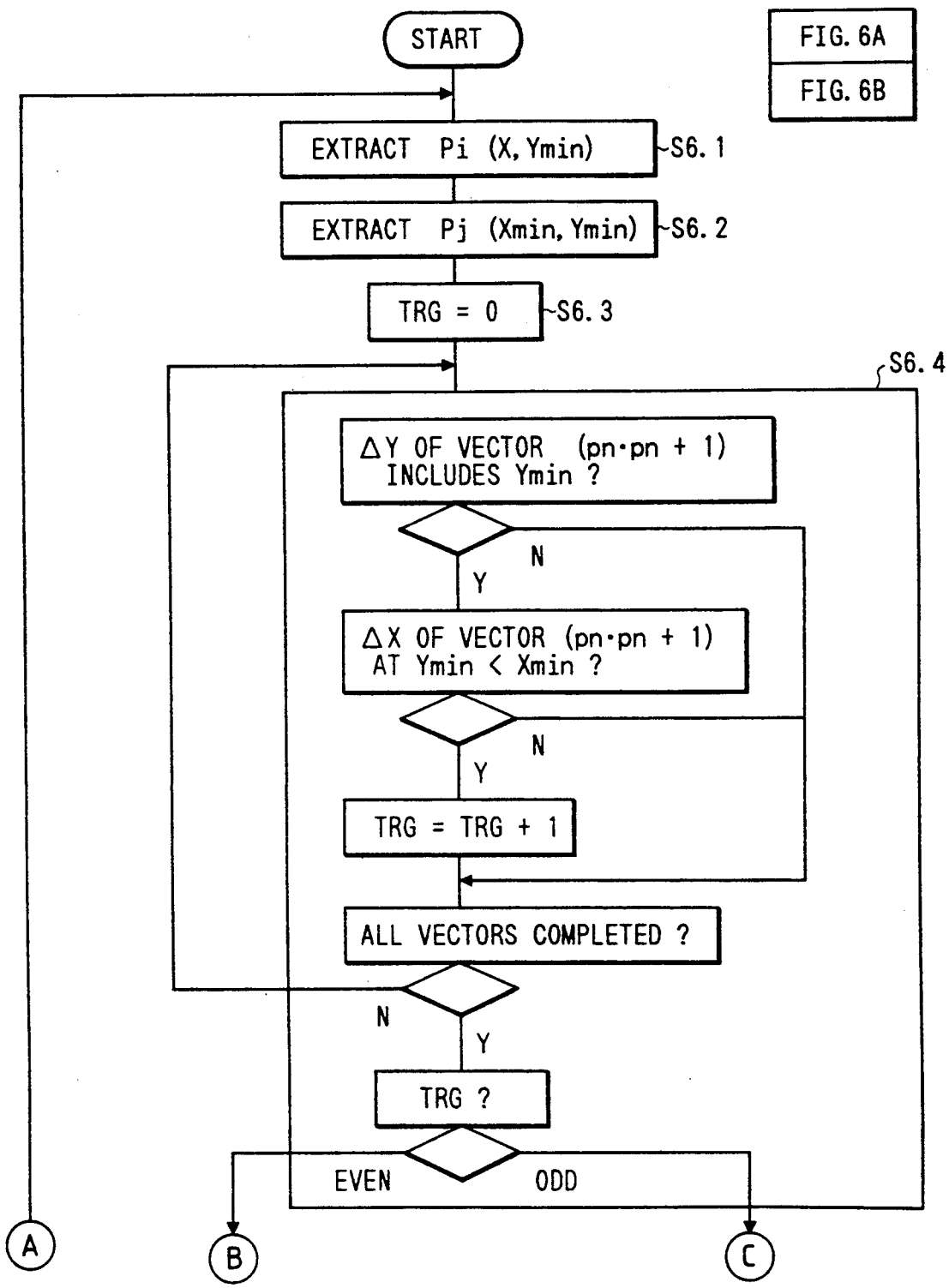

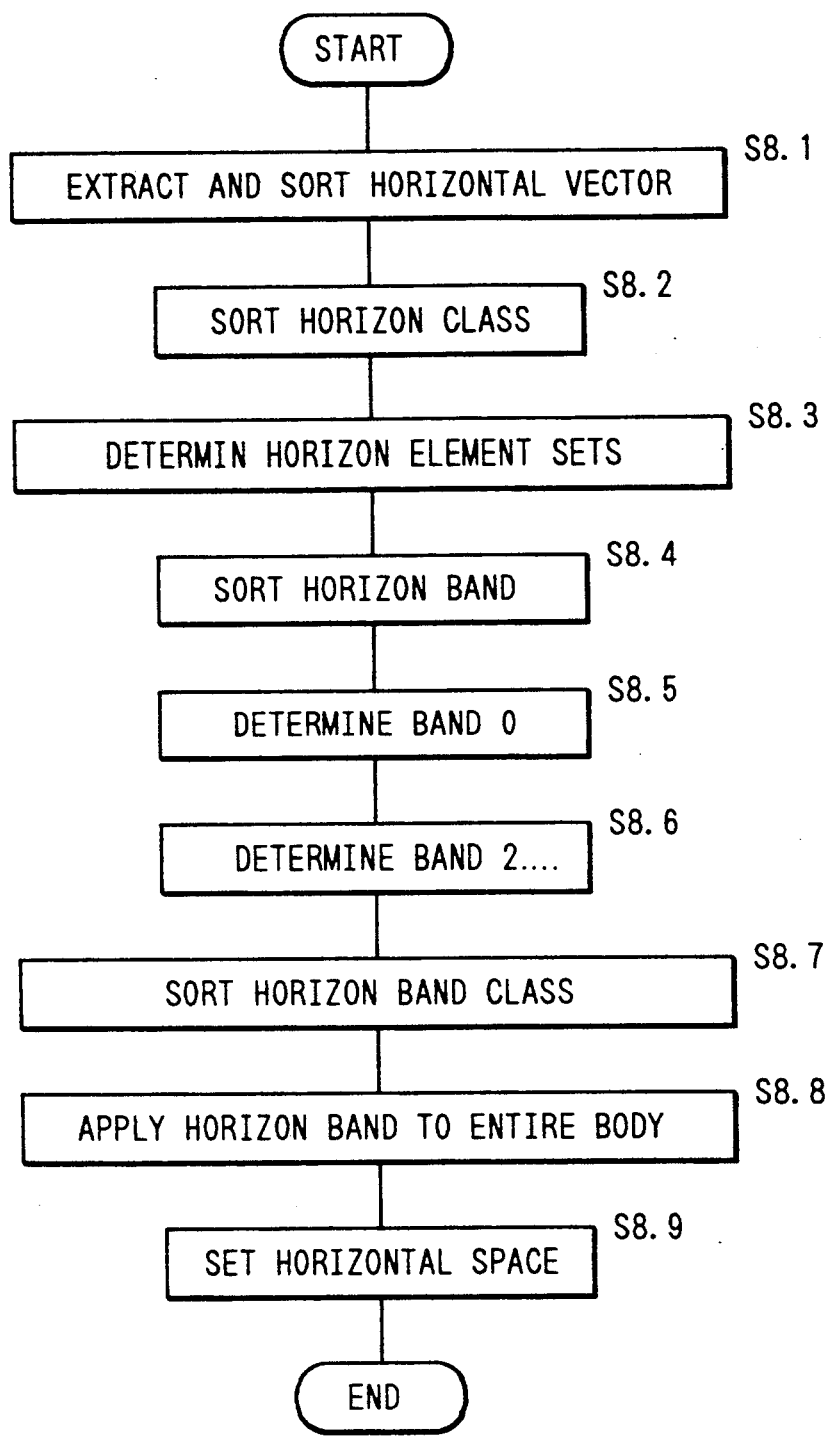

FIG. 9A

| LINE NO | Emin | Emax | CLASS | DIRECTION | Lmin | Lmax | pi·pi+1 | | pi·pi+1 | | pi·pi+1 | |
|---|---|---|---|---|---|---|---|---|---|---|---|---|
| h0 | x119 | x124 | y17 | + | x17 | x18 | p17 | p18 | | | | |
| | | | y119 | - | x119 | x124 | p124 | p119 | | | | |
| h1 | x125 | x132 | y24 | + | x122 | x25 | p122 | p123 | p24 | p25 | | |
| | | | y125 | - | x125 | x132 | p132 | p129 | p128 | p125 | | |
| h2 | x107 | x84 | y6 | + | x110 | x7 | p110 | p111 | p6 | p7 | | |
| | | | y84 | - | x107 | x84 | p84 | p85 | p106 | p107 | | |
| h3 | x126 | x131 | y126 | + | x126 | x131 | p126 | p127 | p130 | p131 | | |
| | | | y133 | - | x133 | x140 | p140 | p137 | p136 | p133 | | |
| h4 | x78 | x34 | y134 | + | x134 | x139 | p134 | p135 | p138 | p139 | | |
| | | | y24 | - | x78 | x34 | p34 | p35 | p77 | p78 | | |
| h5 | x141 | x148 | y36 | + | x75 | x37 | p75 | p76 | p36 | p37 | | |
| | | | y141 | - | x141 | x148 | p148 | p145 | p144 | p141 | | |
| h6 | x142 | x147 | y142 | + | x142 | x147 | p142 | p143 | p146 | p147 | | |
| | | | y149 | - | x149 | x156 | p156 | p153 | p152 | p149 | | |
| h7 | x69 | x46 | y150 | + | x150 | x155 | p150 | p151 | p154 | p155 | | |
| | | | y46 | - | x69 | x46 | p46 | p47 | p68 | p69 | | |
| h8 | x65 | x62 | y50 | + | x50 | x53 | p50 | p51 | p51 | p52 | p52 | p53 |
| | | | y62 | - | x65 | x62 | p62 | p63 | p63 | p64 | p64 | p65 |
| | | | y113 | - | | | p113 | p114 | | | | |
| | | | y22 | - | | | p22 | p23 | | | | |

FIG. 14C

| CORD_INF | Inf[0] | BAND # |
| --- | --- | --- |
| | | CLASS_SEQ |
| | | REG_F |
| | Inf[1] | ⇓ |
| | ⇓ | ⇓ |
| | Inf[No_of_Cp-1] | ⇓ |
| | CORD_OFFSET | Cord_off[0] |
| | | Cord_off[1] |
| | | ⇓ |
| | | Cord_off[n] |

FIG. 15

ZEP_Array:

| | |
|---|---|
| [0] | 16 |
| [1] | 5 |
| [2] | 9 |
| [3] | 11 |
| [4] | 15 |
| [5] | 13 |
| [6] | 7 |
| [7] | 3 |
| [8] | 17 |

Inf_Array:

| | BAND_NO | LINE_SEQ | CPY | CLS | ADG | CVC |
|---|---|---|---|---|---|---|
| | | | | REG_F | | |
| [0] | 0 | 0 | | ZSM | | |
| [5] | 0 | 0 | | ZSM | | |
| [6] | 0 | 0 | | ZLO | | |
| [7] | 0 | 0 | CPY | ZLO | | |
| [8] | 0 | 0 | | ZSM | | |
| [9] | 0 | 0 | | ZSM | | CS |
| [10] | 1 | 1 | | ZSM | | CM |
| [19] | 1 | 0 | | ZSM | | |
| [20] | 1 | 0 | | ZLM | | CS |
| [21] | 1 | 0 | | ZLM | | CM |
| [22] | 1 | 1 | | ZSM | ADG | CM |
| [23] | 1 | 1 | CPY | ZSM | ADG | CE |
| [24] | 1 | 2 | | ZLO | | |
| [25] | 1 | 2 | CPY | ZLO | | |
| [26] | 1 | 1 | | ZSM | | |
| [27] | 1 | 1 | | ZSM | | CS |
| [28] | 1 | 1 | | ZLM | | CM |
| [29] | 1 | 2 | | ZSM | | CM |
| [30] | 1 | 2 | | ZSM | | CE |
| [31] | 1 | 3 | | ZLM | | CS |
| [32] | 1 | 4 | | ZSM | | CM |
| [33] | 1 | 4 | | ZSM | | CM |
| [34] | 1 | 3 | | ZLC | | CE |
| [35] | 1 | 3 | CPY | ZLC | | |
| [36] | 1 | 4 | | ZLO | | |
| [37] | 1 | 4 | CPY | ZLO | | |
| [38] | 1 | 4 | | ZSM | | |
| [39] | 1 | 4 | | ZSM | | CS |
| [40] | 1 | 4 | | ZLM | | CM |
| [156] | 1 | 6 | | ZLO | | |

FIG. 16
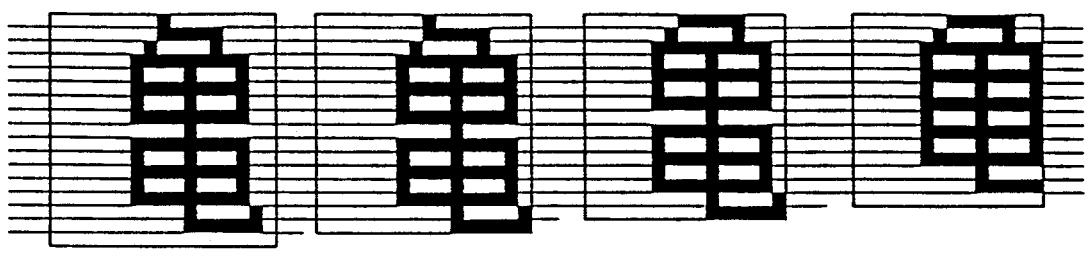
PIX_SIZE = 17        = 16        = 15        = 14
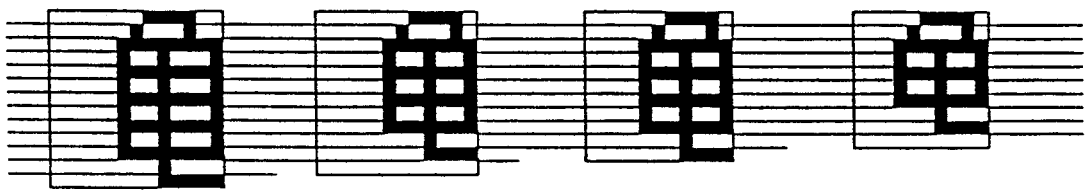
PIX_SIZE = 13        = 12        = 11        = 10
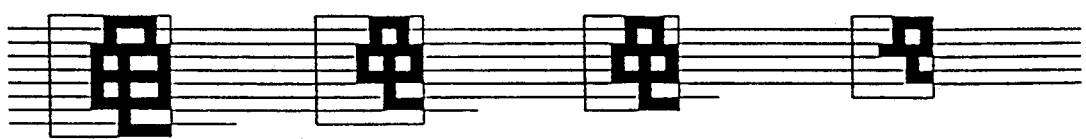
PIX_SIZE = 9        = 8        = 7        = 6

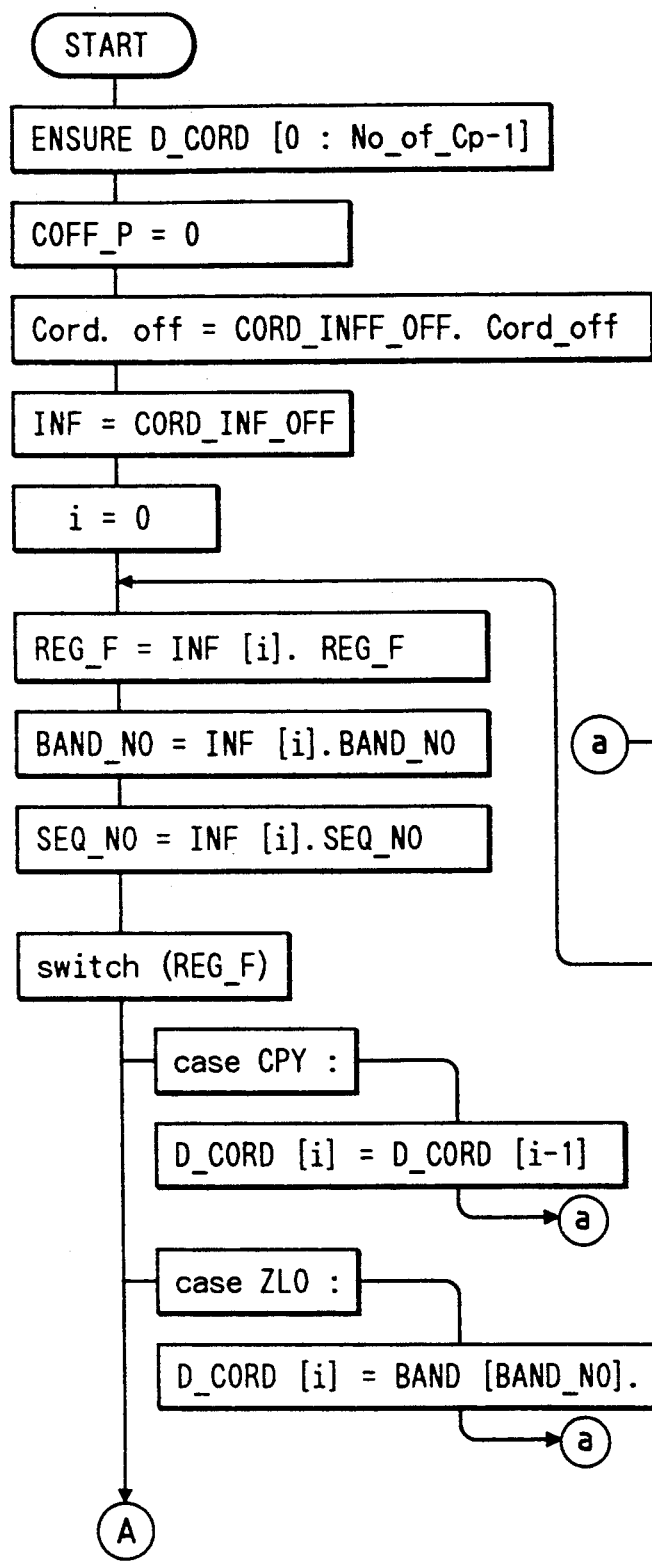
FIG. 21A
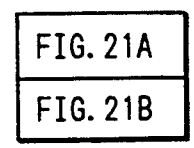
FIG. 21
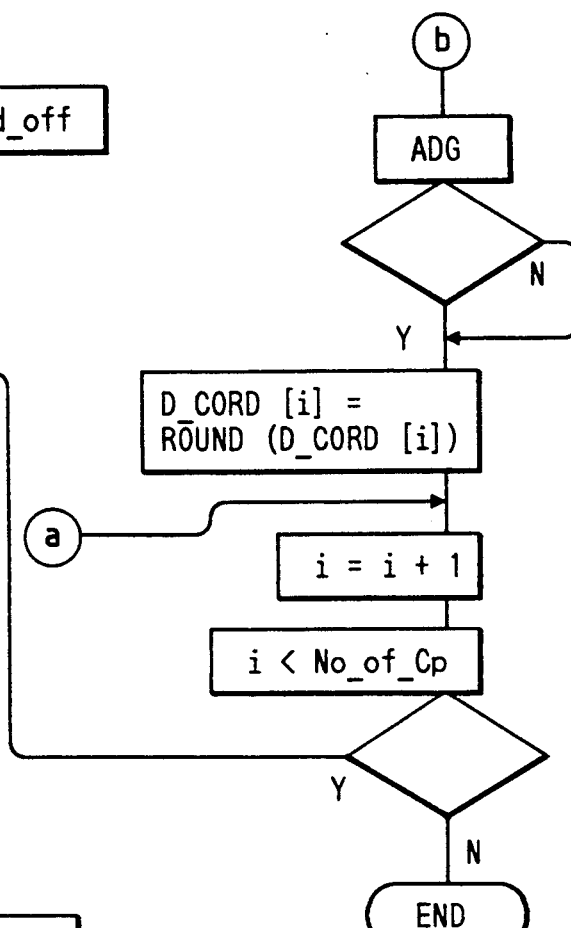

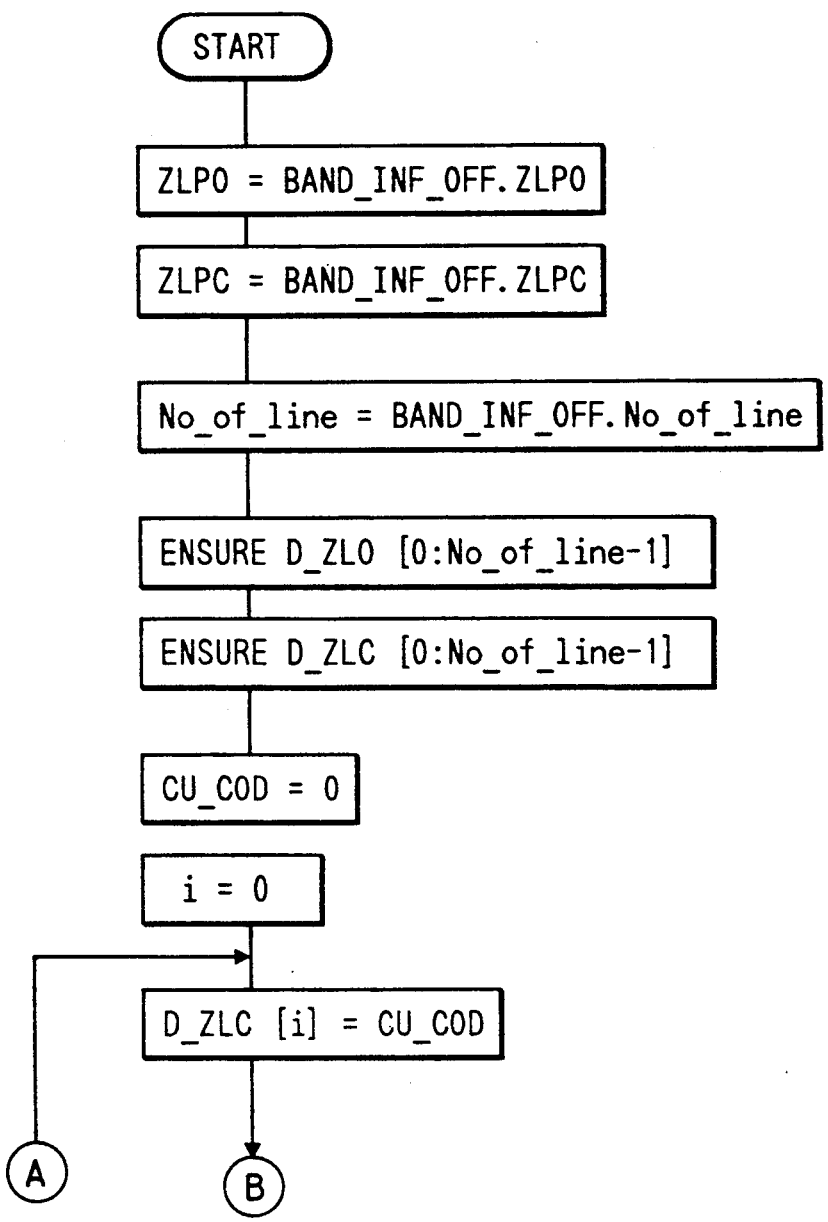

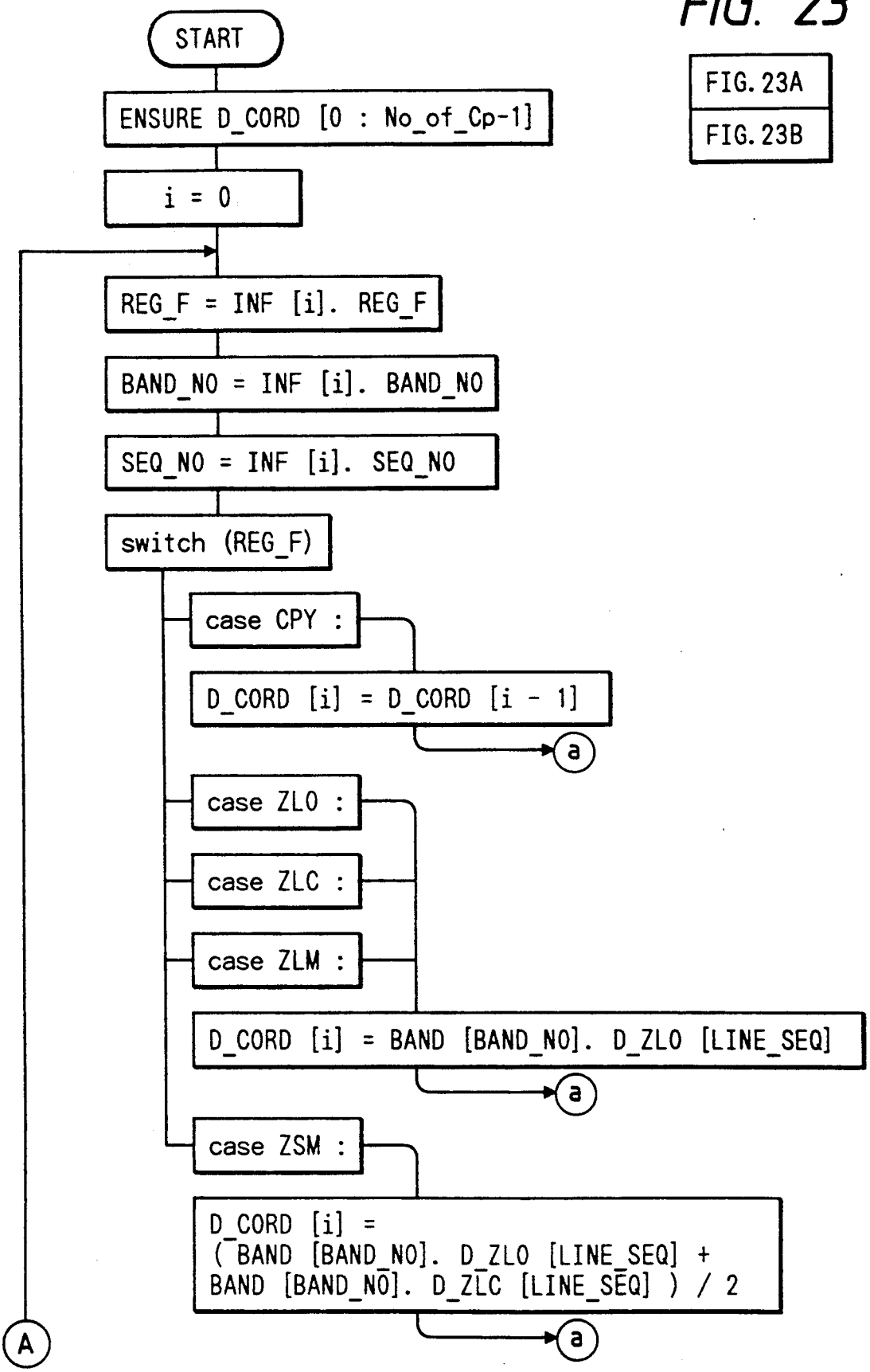

CHARACTER PROCESSING METHOD

BACKGROUND OF THE INVENTION

1. Field of the Invention

The present invention relates to a character processing method in which closed outline coordinate information prepared as standard graphic information and outline information for use to distinguish a plurality of closed outlines included in the above-described information are enlarged or reduced by calculations before they are converted into dot information, the dot information being then converted into bit map development character data for use in an output character-processing apparatus.

2. Related Background Art

Recently, print (print block copy) processing systems arranged in accordance with an electronic method have been significantly widely used with an improvement in the cost performance of a microcomputer, progress of hardware such that a small and precise page printer and a precise monitor display have been popularized, and the substantiality of word processing software.

In the above-described system, the character image output technology, which is the most important factor for forming a print of excellent quality, must meet the following requirements:

As the first requirement, the system must be constituted in such a manner that beautiful characters of a variety of font sizes can be reproduced.

As the second requirement, the same must be constituted in such a manner that characters can be freely developed and decorations can be performed, the decorations being exemplified by italic type, elongating, flattening, shadowing and hatching (internal tiling), so that a free and appealing layout is realized.

As the third requirement, the above-described system must be arranged in such a manner that an image of a specified layout which is finally output from a printer can be directly confirmed (WYSIWYG=What You See Is What You Get) on, for example, a display.

In order to meet the above-described requirements, systems employing a character generating method (hereinafter called an "outline font method"), which is arranged on the basis of defining the outline points of the character image, have been widely used.

According to the outline font method, for example, coordinate data about the control point for expressing the outline of the character is previously prepared in a ROM (Read Only Memory) of the system. Then, in accordance with a character code index, it is read into a temporary storage device RAM (Random Access Memory) so as to be temporarily stored there. Then, in accordance with the specified character output size and the resolution of the output device such as a printer, the above-described coordinate data about the control point is mathematically enlarged or contracted by calculations. Then, it is converted into dot information so that a character can be generated while revealing improved freedom with respect to the output size of the character and the resolution of the output device such as a printer. It has been known that the above-described method is particularly able to form a character of a large size while maintaining improved image quality in comparison to the conventional dot-font character generating method.

However, the outline font method was developed in the first half of the 1960's so as to be adapted to a considerably expensive microfilm output system or a very large size print block copy output system.

That is, the above-described method has been developed so as to be adapted to a high resolution output device of, for example, 1000 DPI (dots per inch which denotes the resolution) so as to first reduce the capacity of data for generating a character for the purpose of making a high resolution output.

In a case of 1000 DPI, the number of pixels per character (the total number of dots theoretically allocated) is $140 \times 140$ when the font size is 10 points which is an ordinary size for a text. If one dot is allocated to one bit in the above-described dot font character generating method, a capacity of 2,450 bytes ($140 \times 140/8$) for one character is required. However, it can be contracted to 1/5 to 1/10 of that quantity in accordance with the outline font method.

On the other hand, in a case where a bit map character is output from the above-described high resolution output device by the outline font method, there arises no critical problem of a quantization error which takes place as a result of calculations for mathematically enlarging or contracting the above-described coordinate value of the control point. That is, the accuracy in the reproduced character image and the quality of the reproduced image have not encountered any such problem.

However, the above-described print processing system arranged in accordance with the electronic method is considerably different from the hardware structure of the great size system in that it is arranged to be adapted to a work station for personal use. Therefore, the hardware must meet a desire of reducing the overall cost while realizing satisfactory performance. That is, the above-described small and precise page printer is, for example, a laser printer capable of outputting B4 sheets at 400 DPI. In this case, it suffers from the small number of pixels which can be allowed for each character. For example, in a case of a printer of 400 DPI, the number of pixels per 10-point character is $56 \times 56$, while the same is $44 \times 44$ in the case of an 8-point size. Therefore, the above-described influence of the quantization error becomes more critical in an output device of a low resolution.

Therefore, a first problem arises in that the quality of the output bit map character deteriorates in a case of the resolution of the page printer of the above-described print processing system arranged in accordance with the electronic method and the conventional outline font method, the quality deterioration being exemplified by a problem of excessive thickening of lines constituting the character, irregular line widths, oblique spaces between lines, zigzag curves and an unsatisfactory level of the realized symmetry. In particular, the above-described problems become more critical in a case of the font size which is usually used for a text.

A second problem arises in that the resolution possessed by a monitor display usually is, for example, about 100 DPI, which is lower than the resolution of the above-described printer, although there is a desire of employing a common character outputting method which does not depend upon the resolution of the devices such as the printer and the monitor display for the purpose of realizing the WYSIWYG, which is necessary to improve the document processing software.

In a case of a 100 DPI monitor display, the number of pixels per character of 10-point size is 14×14, while the same is 11×11 in a case of a character of 8-point size.

It has been known that 16×16 pixels: with which the type of the character can be discriminated (however, a complicatedly formed character must be simplified) and 24×24 pixels: with which the Ming type and Gothic type can just be distinguished from each other are necessary to form a dot-imaged kanji.

Accordingly, it has been disadvantageous in a case of the font size for a text because of the number of pixels if characters are imaged in accordance with the outline font method and by using a monitor display of about 100 DPI. That is, the deterioration in the quality of the output bit map character becomes more critical with respect to the case of the above-described first problem. Therefore, a critical problem has arisen when WYSIWYG is intended to be realized. Hitherto, an arrangement has been therefore employed in which individual character processing methods or systems are provided for, for example, the monitor display and for the printer in accordance with the resolution of the output device to be connected. As an alternative to this, they are individually provided for each number of pixels per character.

However, there arises a necessity in the above-describe system in that each of the fonts must be simultaneously changed to correspond to an improvement of the system such as the increase in the number of the types of the fonts. If the above-described change is not performed, a problem arises in that the character displayed on the monitor display becomes different from that output from the printer.

Furthermore, there is a system which does not employ the outline font method in the monitor display thereof and in which a pseudo enlargement and-contraction-are performed by means of the dot font to display the character. However, another problem arises in that the final image, which is a critical factor in performing a layout of the page, cannot be completely confirmed.

As described above, there arises a critical technological problem when the outline font method is, to meet the desire of realizing WYSIWYG, used as a common character output method which does not depend upon the resolution of the devices to be connected including the low resolution monitor display. Furthermore, the conventional methods for use to overcome the above-described problem encounter a variety of problems.

A third problem arises in that an addition of correction data, with which a forcible correction is performed for the purpose of absorbing in the visible level of the quantization error due to the calculations for mathematically enlarging or contracting the coordinate value of the control point, will require an excessively large amount of human work to carry out at the addition of the correction data to each of the characters. Furthermore, the conventional character data property established in accordance with the conventional outline font method cannot used.

SUMMARY OF THE INVENTION

According to the present invention, when information about the coordinate of a closed outline prepared as standard graphic information and outline information for distinguishing a plurality of closed outlines included in the graphic are enlarged or contracted by calculations in accordance with the specified output size before they are converted into dot information, and then dot information is converted into character data for a bit map for use in a character processing apparatus for outputting data, the following processes are performed: recognizing an exterior outline, an interior outline, a horizontal line and a vertical line and classifying them before a segment pair of the horizontal line and the vertical line is determined and classified; setting a horizontal and vertical space regions and a skipping order at the time of a low pixel; and performing a conversion to character data for a bit map development which is composed of the coordinate of the control point for expressing the outline of the subject character, outline information for distinguishing the plurality of the closed outlines, band information, information about the control point for making a reference to the band information and information about the coordinate value of the control point which is not included in the band information. As a result, character data for a bit map development which can be output with a wide range of font sizes and maintaining a high quality can be efficiently obtained.

Other and further objects, features and advantages of the invention will be appear more fully from the following description.

BRIEF DESCRIPTION OF THE DRAWINGS

FIGS. 4A and 4B illustrate character outline control point data:

FIG. 8 is a flow chart of a process of processing band information;

FIGS. 9A and 9B illustrate an example of the result of determining a horizontal segment pair of " 機 " and a vertical segment pair;

FIGS. 14A to 14C illustrate a method of storing character data for the bit map conversion;

FIG. 15 illustrates information about the control point;

FIG. 16 illustrates a method of allocating pixels in a case where PIX_SIZE is 17 or less;

DETAILED DESCRIPTION OF THE PREFERRED EMBODIMENTS

Figure 1:
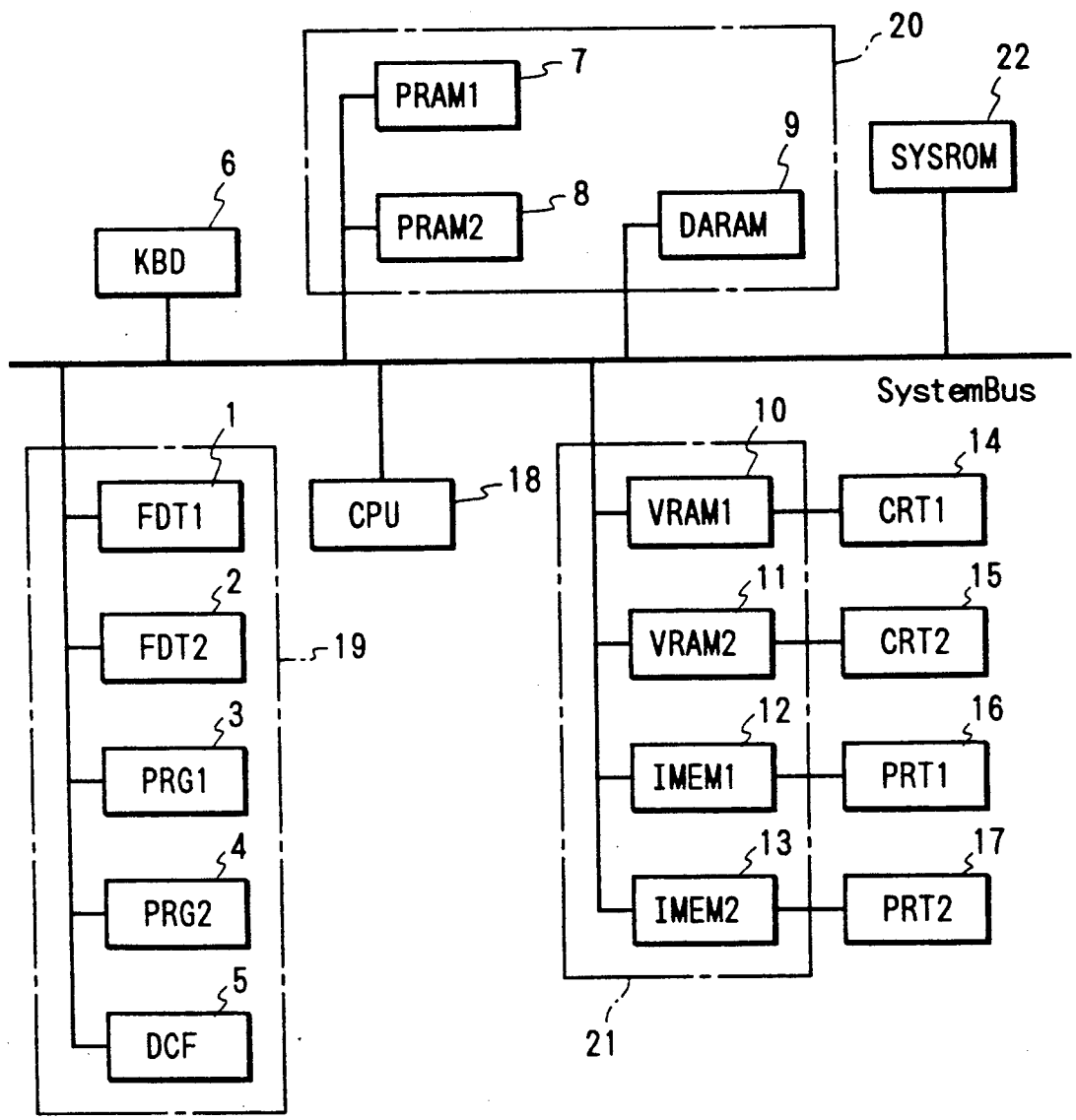
FIG. 1 is a system structural view according to the present invention.

FIG. 1 is an example of a diagram of a system which is necessary to which the present invention is adapted.

The present invention is not limited to the illustrated apparatus. The present invention can, of course, be adapted to a single device or a system composed of a plurality of devices combined. Furthermore, the function of the present invention can, of course, be achieved by supplying a program to an apparatus.

Referring to FIG. 1, reference numeral 1 represents a storage region for storing character data serving as a standard to be described later. Reference numeral 2 represents a storage region for storing character data for bit map conversion to be described later. Reference numerals 3 and 4 represent program storage regions for storing a program to be described later and acting for the purpose of executing the present invention. Reference numeral 5 represents a document file storage region in which input data to be supplied to a character processing apparatus to be described later and according to the present invention has been previously stored. Reference numeral 6 represents a keyboard device for use by an operator or the like when the operator operates the system according to this embodiment. Reference numerals 7 and 8 represent program RAMs (Random Access Memories) which are necessary to load programs to be described later and acting for the purpose of executing the present invention at the time of the execution of the programs. Reference numeral 9 represents a RAM for data and acting to temporarily store all intermediate data items during the data processing flow which are necessary when the system according to this embodiment is operated. Reference numerals 10, 11, 12 and 13 represent RAMs which form a frame buffer 21 composed of bit maps to be described later, RAMs 10, 11, 12 and 13 acting to display or transmit a character to actual output devices, that is, monitor displays CRT1 CRT2, printers PRT1 and PRT2 respectively represented by reference numerals 14, 15, 16 and 17. Reference numeral 18 represents a CPU (Central Processing Unit) for controlling the components of the system according to this embodiment at the time of starting the system. Reference numeral 19 represents a disk device for storing the above-described elements 1, 2, 3 and 4 when considered as hardware of the system. An element represented by reference numeral 20 may be an ordinary DRAM (Dynamic Random Access Memory) when considered as hardware of the system. Reference numeral 22 represents a ROM (Read Only Memory) in which, the components of the system and the like are stored. The monitor displays and printers respectively represented by reference numerals 14, 15, 16 and 17 individually possess respective output resolutions. For example, assumptions are made that the CRT1 represented by reference numeral 14 possesses a resolution of 100 DPI, the CRT 2 represented by reference numeral 15 possesses a resolution of 72 DPI, the PRT1 represented by reference numeral 16 possesses a resolution of 400 DPI and the PRT2 represented by reference numeral 17 possesses a resolution of 1000 DPI.

Description of Definition of Character Data Serving as Standard

Prior to making a description about the definition of character data serving as the standard according to this embodiment, a description will now be made about outline coordinate information in a case where the above-described character data is considered to be standard graphic information.

The character data serving as the standard can be processed by a variety of methods exemplified by a method in which an ordinary or an exclusive CAD (Computer Aided Design) system is used to input a polygonal graph or a curve graph as coordinate data. Another method can be employed in which the character original-document is digital-scanned to be temporarily fetched as a bit map image in the computer and characteristics points are extracted by software using an outline tracing algorithm. However, the thesis of the present invention is not limited to the described methods.

Although the description will now be mainly made about kanji used in Japanese, the present invention can be similarly adapted to characters and graphs for use in other languages, such as alphabetic characters. In addition, the present invention can also be adapted to information denoting ordinary graphics (vector graphics). According to this embodiment, character data serving as the standard, together with index codes for reading out the character data in units of a character, are stored in FDT1 designated by reference numeral 1 of FIG. 1.

Character data serving as individual standards is composed of the following three types of information:

a font coordinate system, a character outline control point data and outline information.

Font Coordinate System

Figure 2:
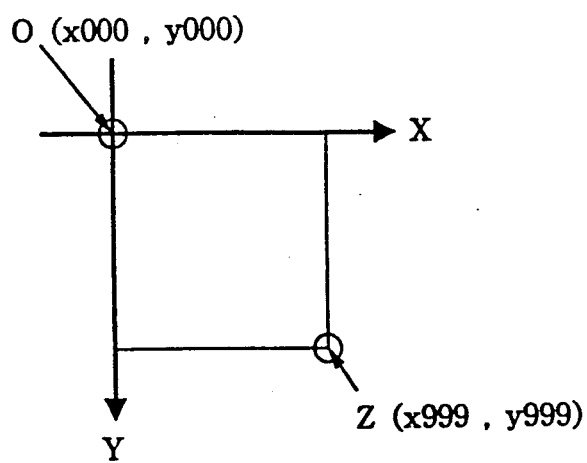
FIG. 2 illustrates a font coordinate system.

An example of the font coordinate system according to the present invention is shown in FIG. 2.

Referring to FIG. 2, a two-dimensional coordinate system defined by axes X and Y is arranged in such a manner that the system has the upper left origin 0 (x000, y000) and lower right body diagonal point Z (x999, y999).

In general, it is preferable that actual values be x000=y000=0, x999=y999=(512 to 1024).

The rectangle in which the above-described points O and Z positioned diagonally correspond to the body of a character.

The position of the origin and the directions of X and Y axes may be arbitrary determined to suit to the subject system.

Character Outline Control Point Data

Figure 3A:
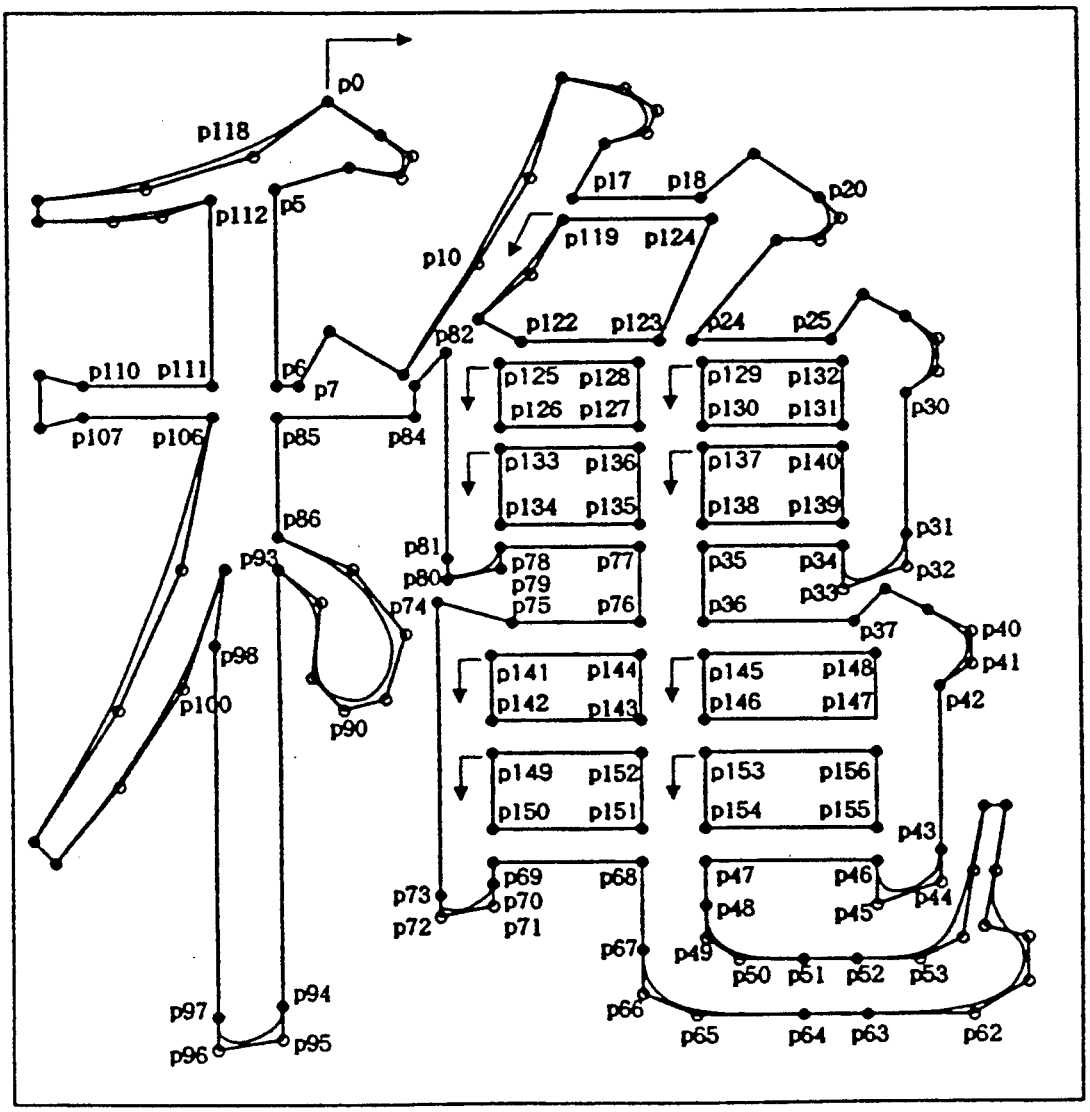
FIGS. 3A to 3E illustrate the displacement of control points of reference character data.
Figure 3B:
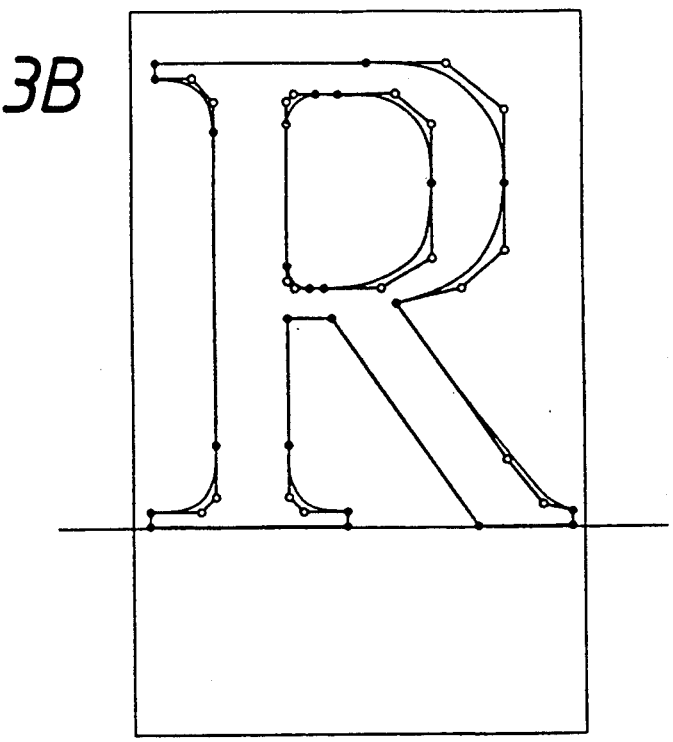
Figure 3C:
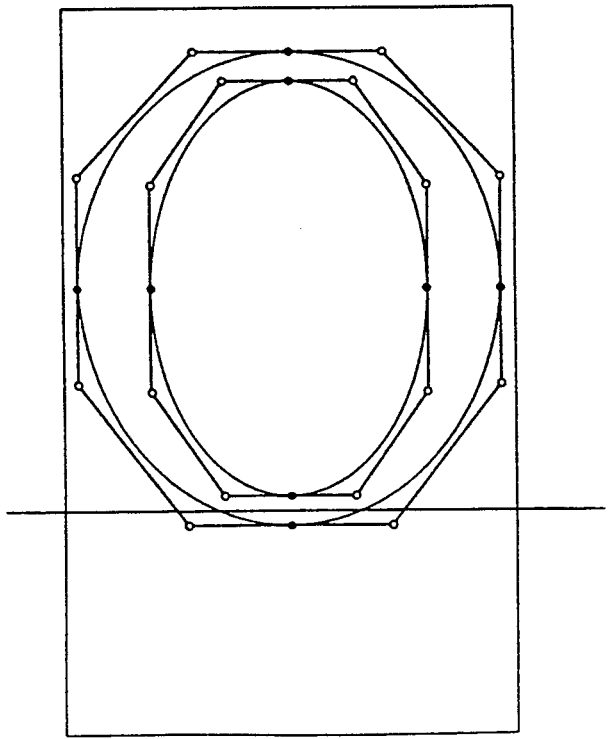
Figure 3D:
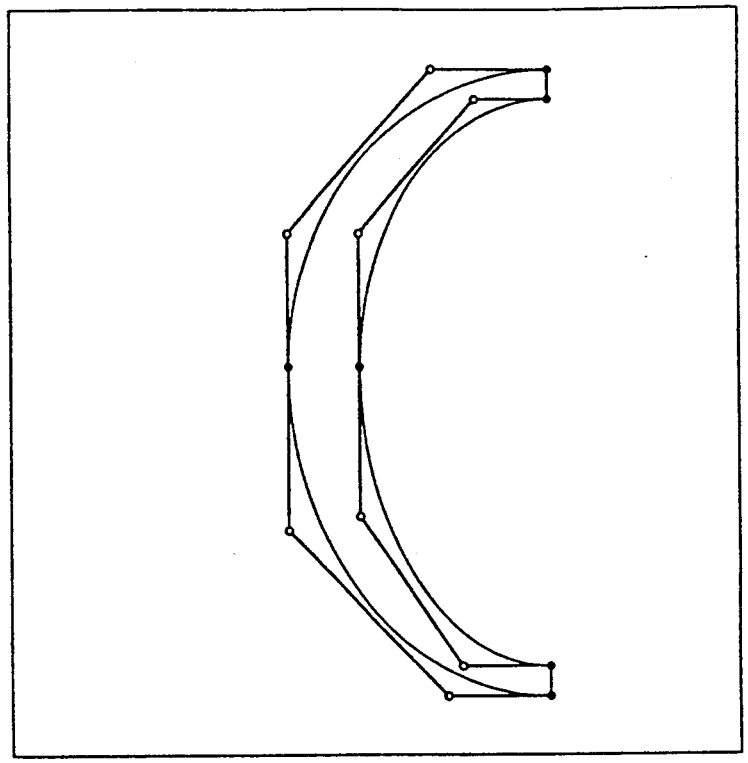
Figure 3E:
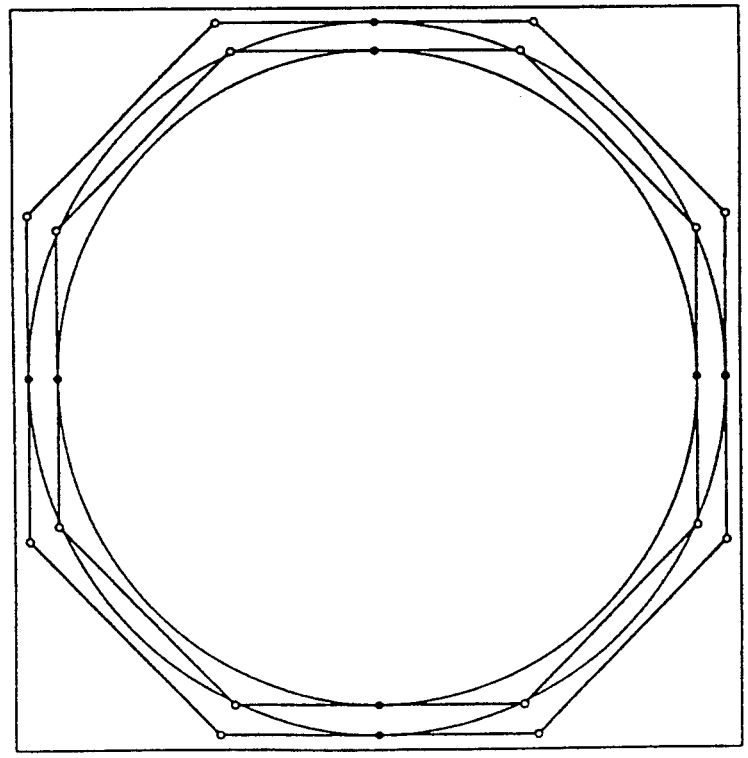

As an example of character data serving as the standard of the above-described font coordinate system, a Ming type character "秋" (read "shu" and meaning autumn) is shown in FIG. 3A. Furthermore, data about the corresponding character outline control points is shown in FIGS. 4A and 4B.

Data about the character outline control point is composed of character outline control point (hereinafter called a "control point") configuration shown in FIG. 4A and outline start point information (hereinafter called "outline information") shown in FIG. 4B for establishing a relationship between the above-described control points, the outline start point information being described later.

According to this embodiment, the number of the control points is 157 which are respectively called p0 to p156.

Each control point P possesses an X coordinate and a Y coordinate so that the actual coordinate values of p0 to p156 are, as shown in FIG. 4A, called (x0, y0) to (x156, to y156).

Furthermore, the character outline control point has attribute information C for distinguishing a fact that the control point P denotes the end point of the straight portion of the character or a control point for a curve interpolation to be described later, the character outline control point being called c0 to c156 to correspond to the control point P. In a case where each control point P is the end point of a straight portion, c0 to c156 possess ST as an actual value. In a case where the same is the control point for the curve interpolation, it possesses CS (curve start point), CM (curve intermediate point) or CT (curve terminal point).

The above-described values ST, CS, CM and CT are stored as actual values, for example, 0, 1, 2 and 4.

Referring to FIGS. 3A-3E, control points showing ST, CS and CT are expressed by black points, while control points shown in CM are expressed by white points.

As the above-described curve interpolating method, a multiplexed NOT cubic B-spline curve method or a cubic Bezier curve method is used according to this embodiment.

Since the mathematical characteristics and graphic expression of the above-described curves are disclosed in detail in, for example, "bit", No. 10 to 12, vol. 13 published by Kyoritsu Shuppan, a detailed description thereof is omitted here.

Although the curve interpolating method is not limited to the above-described curves, the reason why the above-described cubic curves are employed according to this embodiment is as follows: a major portion of ordinary European characters such as "R" and "O" for use in an ordinary European face such as the Romanized face and the sans serif fac, digits and symbolic graphics having symmetric curves such as "(", "ſ" parenthesis, "○" (circle) can be processed in such a manner that the configuration of the control points expressing the curved portion can be processed in the similar manner to the configuration of the control points expressing the straight portion.

That is, any curve interpolating method may be employed if it can be treated in the above-described manner.

For example, it is know that the quadratic B spline curve and quadratic Bezier curve are able to meet the above-described requirement. Outline Information There are, at the above-described control points, provided information showing the relationship about the connection between adjacent control points.

That is, the above-described information is information for use to distinguish a fact that the adjacent control points in the configuration must be connected as a closed outline or they are control points on individual outlines. According to this embodiment, the following information is provided:

In a case of a character graphic shown in FIG. 3A, the number of outline start points showing the number of the closed outline is 10 which are called t0 to t9 as shown in FIG. 4B. The outline information according to this embodiment has an outline starting point and an outline terminal point (actually, the same may has either the outline starting point or the outline terminal point) for the convenient of the process to be described later.

That is, the first outline information t0 has the outline start point p0 and the outline terminal point p118, while the second outline information t1 has the outline start point p119 and the outline terminal point p124. The third and ensuing outline information are arranged similarly.

Furthermore, there is provided the total number No_of_Cp of the outline control points and the total number nt of the outline starting points at the leading portion of the outline information. According to this embodiment, there is provided No_of_Cp=157 and nt=10 as the actual values as can be clearly seen from FIGS. 3A, 4A and 4B.

The character data serving as the standard is defined as described above, it being an ordinary definition of the character graphic according to the above-described conventional outline font method.

However, the above-described various problems take place in the electronic print processing system if the bit mat conversion process is performed by using the above-described character data serving as the standard in such a manner that the coordinate values of the control points shown in FIGS. 4A and 4B are simply enlarged or contracted by the calculations.

Accordingly, the present invention is arranged in such a manner that the following means is used to automatically process bit map conversion character data from the character data serving as the standard.

Figure 5:
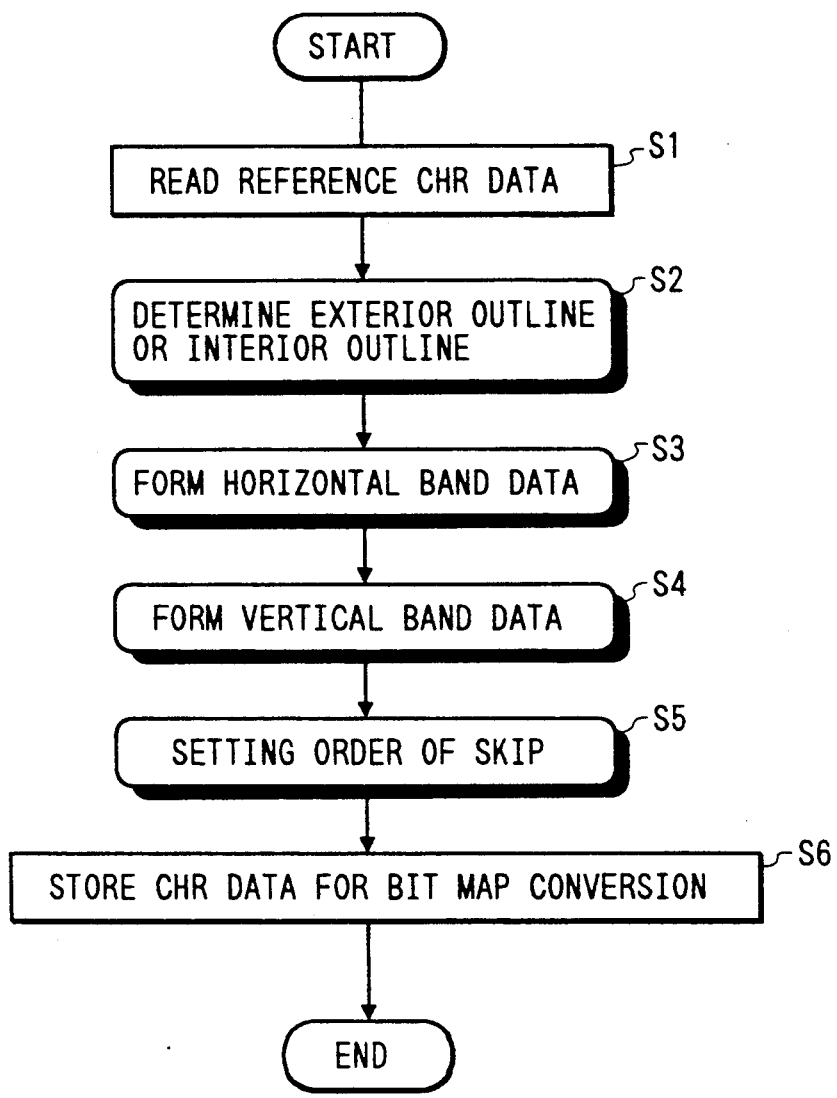
FIG. 5 is a flow chart of a process of automatically processing character data for bit map conversion from the reference character data.

The above-described means comprises the following steps of:

Reading reference character data (step S1 shown in FIG. 5);

Determining exterior outline or interior outline (step S2);

Forming horizontal band information (step S3);

Forming vertical band information (step S4);

Setting order or skip at the time of a low pixel (step S5); and

Storing character data for bit map conversion (S6).

The above-described steps are arranged as shown in a flow chart shown in FIG. 5.

The above-described means is, in the form of a software program, in PRG1 denoted by reference numeral 3 shown in FIG. 1. The software program is loaded in PRAM 1 denoted by reference numeral 7 in response to a command issued from KBD denoted by reference numeral 6 so as to be sequentially controlled by a CPU denoted by reference numeral 18.

All of intermediate data items required to automatically process bit map conversion character data from reference character data are temporarily stored in a DRAM denoted by reference numeral 9 shown in FIG. 1. Reading of Reference Character Data Reference character data is read from FDT1 denoted by reference numeral 1 shown in FIG. 1 in each character unit in accordance with the above-described index information before it is stored in the DRAM denoted by reference numeral 9 shown in FIG. 1.

Determination of Exterior Outline and Interior Outline

Figure 6B:
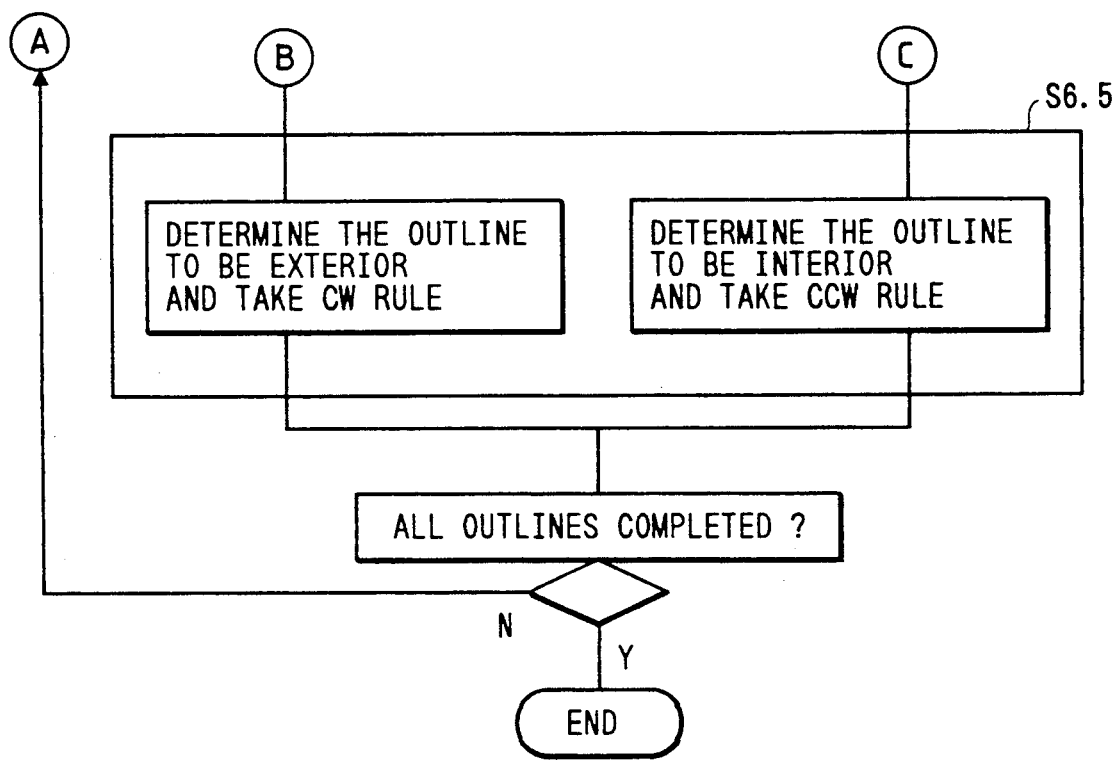
FIG. 6, consisting of FIGS. 6A and 6B is a flow chart of a process of discriminating the exterior outline and the interior outline.

As described above, character outline control point data forms one or more closed outline at sequential control points from the outline starting point to the outline terminal point. It is necessary to distinguish the closed loops the inner portion of which is "black" and those the inner portion of which is "white". The configuration must be, for example, ordered in such a manner that the righthand portion when viewed in the direction of the proceeding of the control point is always "black". It can be automatically determined as follows:

FIG. 6 illustrates a flow chart for the process of distinguishing the exterior and interior outlines and FIG. 7 illustrates a supplement concept. Then, the description will be made with reference to FIGS. 6 and 7.

Each of the closed outlines is subjected to the process the sequence of which is arranged to be steps (6.1) to (6.5) shown in FIG. 6 so that the exterior outline and the interior outline are distinguished from each other.

Step (6.1)

At the control point belongs to each of the closed outline, control point pi (X, Ymin) having the minimum Y-coordinate value is extracted. However, a plurality of pi can be present.

Step (6.2)

At the control point pi which can comprise a plurality of points, control point pj (Xmin, Ymin) having the minimum X-coordinate value is extracted. The control point pj is limited to one with respect to each closed outline. Steps (6.1) and (6.2) are briefly illustrated in FIG. 7A.

Step (6.3)

"Transverse" count variable TRG required in step (6.4) to be described next is initialized (TRG=0).

Step (6.4)

By counting the "Transverse" to be described later, the exterior and interior outlines are distinguished from each other. That is, in a case where all of the outline vectors (straight vector pn·pn+1 belonging to one closed outline and formed by two adjacent control points) meet the requirement made that the Y component displacement includes the above-described Ymin and as well as the X component at the vector Ymin is smaller than the above-described Xmin, TRG is increased by 1 (TRG=TRG+1).

It means counting the number of times at which the outline vectors are transversed when Ymin in the Y-coordinate is scanned horizontally from the left end portion x000 of the body while making the above-described pj (Xmin, Ymin) to be the target coordinate value. If a result is obtained that the variable TRG is an even number including 0, it can be determined that the subject outline is an exterior outline. In a case where the same is an odd number, it can be determined that the subject outline is an interior outline.

Step (6.5)

Figure 7A:
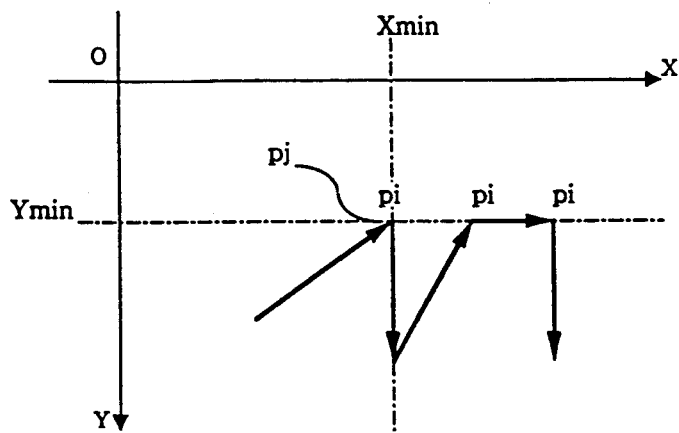
FIGS. 7A to 7D supplementally illustrate the process of the flow chart shown in FIG. 6.
Figure 7B:
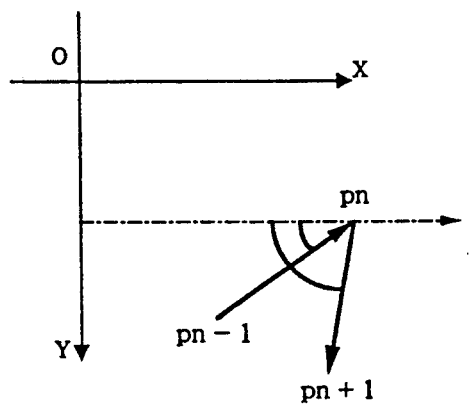
Figure 7C:
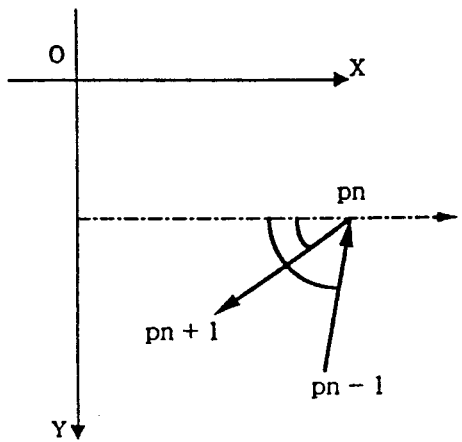

In order to order the configuration in such a manner that the right-hand portion in the direction in which the control point proceeds is always made to be "black" in accordance with the result of the determination made in the above described step (6.4), a comparison of the angular degree is made in such a manner that the angles made between pn and its two adjacent points pn−1 and pn+1 are compared as shown in FIGS. 7B and 7C. That is, in a case where a determination is made that the subject outline is an exterior outline, the direction in which the control point proceeds in such a manner that the adjacent point, which makes a larger angle, is positioned next to pn as shown in FIG. 7C.

All of the closed outlines are subjected to the above-described steps (6.1) to (6.5).

Figure 7D:
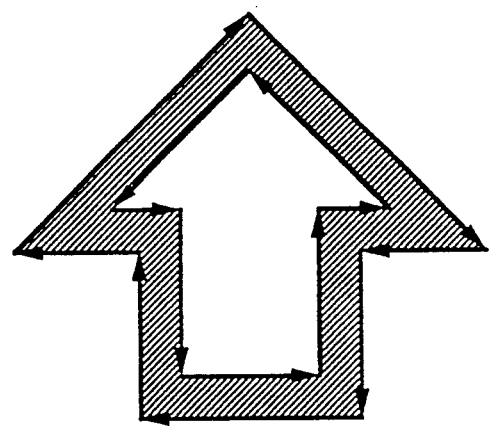

As a result of the above-described process, the control point configuration denoting the exterior outline proceeds clockwise direction as shown in FIG. 7D, while that denoting the interior outline proceeds counterclockwise direction. Hereinafter the above-described rule is called a "CW" (Clockwise) rule (the clockwise direction is called a "CW" and the counterclockwise direction is called a "CCW" (counterclockwise) direction).

Processing of the Horizontal Band Information and Vertical Band Information

The horizontal band information and the vertical band information are processed as shown in a flow chart shown in FIG. 5 through the following steps:
  Extracting and sorting horizontal [vertical] vector;
  Sorting the horizontal [vertical] class (CLASS);
  Determining the horizontal [vertical] segment;
  Classifying the horizontal [vertical] band;
  Determining horizontal [vertical] band 0;
  Determining band ensuing horizontal [vertical] band 1;
  Sorting horizontal [vertical] band class;
  Applying the horizontal [vertical] band to the entire body; and
  Setting a horizontal [vertical] space.

The above-described steps can be shown in a flow chart shown in FIG. 8.

Concept of Band Information

Then, processing of the above-described horizontal band information and vertical band information will now be described with reference to the flow chart shown in FIG. 8. Prior to this, its concept will first be described.

The above-described process is based upon an aesthetic appreciation possessed by a most ordinary print face for use in a print processing system arranged in accordance with the electronic method.

That is, the major portion of the above-described print faces represented by Ming type and Gothic type are formed in such a manner that 50% or more portions of its character factor is constituted by horizontal lines and vertical lines.

As described above with reference to FIG. 3, according to this embodiment, the coordinate values of the outline control point of a curved portion of a Europe type and that of a symbol or a character having symmetric curved lines can be treated similarly to the coordinate values of an outline control point expressing a vertical line. That is, in the process according to this embodiment, the horizontal segment and the vertical segment of the outline control point for defining the above-described character graphic are considered.

Furthermore, according to this embodiment, the horizontal segment and the vertical segment are individually administrated in such a manner that the horizontal band information is first processed as shown in the flow chart shown in FIG. 5. Then, the vertical band information is processed. However, the above-described two process can be performed in the same manner because only the coordinate component (according to this embodiment, the X and Y coordinate factors), which is the subject of the calculations to be performed in the above-described process, is different between the two processes.

Figure 11A:
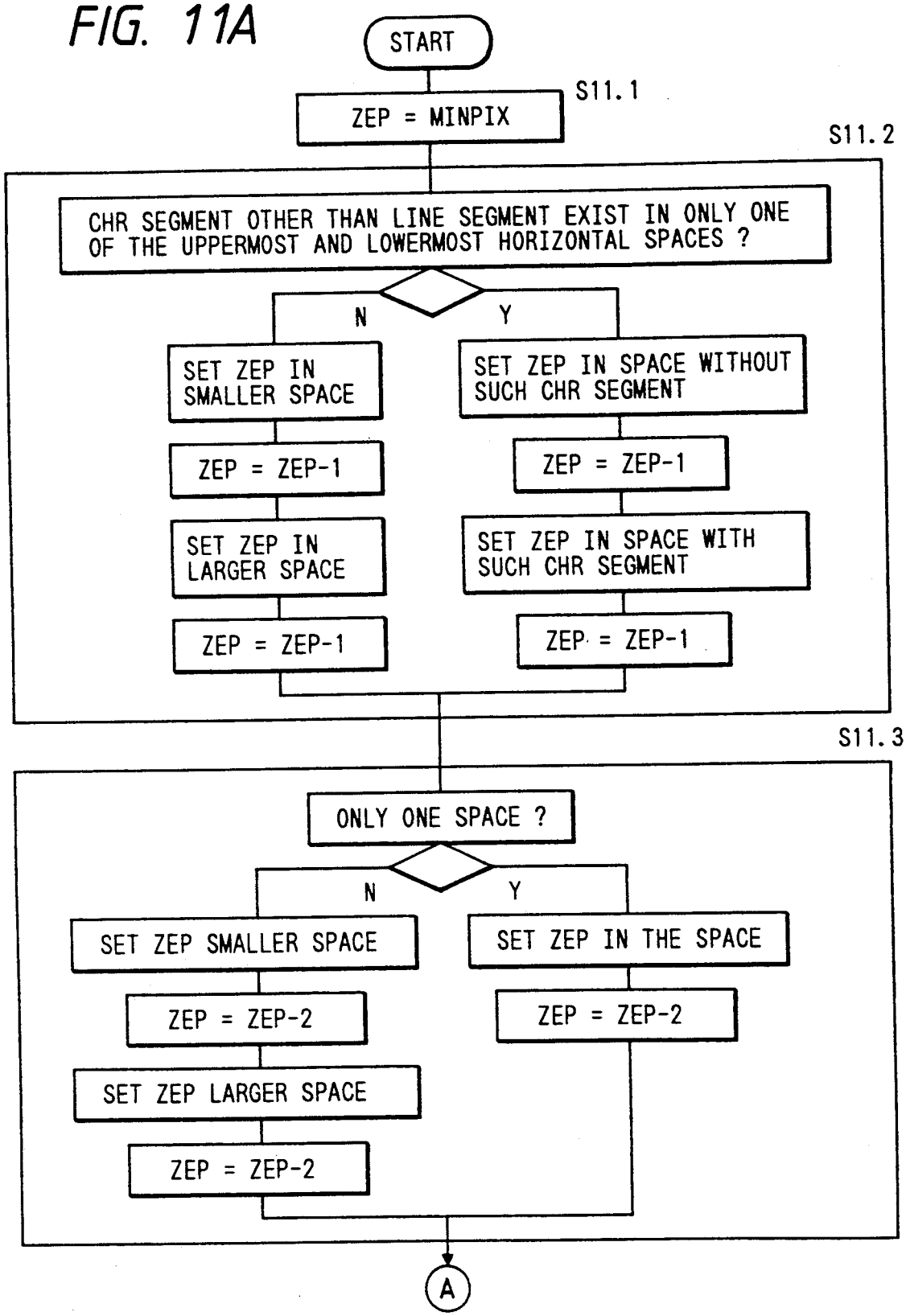
FIGS. 11A and 11B are flow charts of a process of setting a skipping order at the time of a low pixel.

Then, the process of forming band information about the horizontal segment will now be described with reference to each step shown in flow charts shown in FIGS. 8, 11A and 11B. As for the vertical segment, its description is omitted because of the above-described reason while the result of the process being arranged to be described later. Process of Forming Horizontal Band Information As described with reference to FIG. 6, X displacement dx and Y displacement dy of vectors (pk·pk+1) (k=the outline starting point of each closed outline to the outline terminal point, however pk+1=the outline starting point in a case where pk=the outline terminal point) composed of adjacent two control points the configuration order of which has been determined (rearranged in accordance with the result of the determination made whether the exterior outline or the interior outline) in accordance with the CW rule and X-coordinate value p (x) and Y-coordinate value p (Y) are subjected to the following processes:

Step (8.1)

Extraction and Sorting of Horizontal Vector

Pairs (pk·pk+1) in which dy=0 are extracted. That is, pairs (pk·pk+1) in which pk (y)=pk+1 (y) are extracted. Then, vectors having the dx (positive or negative, 0 is impossible) of the same sign (hereinafter called "directional classification") and the same Y coordinate p (y) are called the same horizontal class (hereinafter called "CLASS"). In this state, it can be seen from FIG. 7D that the class in which the dx sign is positive designates the upper side of a horizontal line of subject character data, where the class in which the dx sign is negative designates the lower side of the same.

Step (8.2)

Sorting of Horizontal Class (CLASS)

Each horizontal class (CLASS) is sorted in the ascending order of the value of the Y coordinate p(y) in such a manner that the sorting is performed in each of the above-described directional classes. Furthermore, the minimum value Lmin and the maximum value Lmax of the value of the X-coordinate in each horizontal class are obtained.

Step (8.3)

Determination of Horizontal Segment

Each of the horizontal class (CLASS) having dx the sign of which is positive, that is, the class corresponding to the upper side is subjected to a process in which the horizontal class (CLASS) having corresponding dx the sign of which is negative, that is, the class corresponding to the lower side is determined (made correspond to each other) as the horizontal segment pair by the following method:

Letting value (Y-coordinate value) of the subject CLASS to be determined be CLASS0,
Lmin of the same be Lmin0,
Lmax of the same be Lmax0,
the value (Y-coordinate value) of CLASS which must corresponds as the horizontal segment pair be CLASS1,
Lmini of the same be Lmin1 and
Lmax of the same be Lmax1, the horizontal classes meeting the following conditions are extracted;
CLASS0 < CLASS1,
Lmin1 < Lmax0,
Lmin0 < Lmax1 and
the value of (CLASS1 − CLASS0) is the minimum value.

As a result of the determination thus-made, a horizontal segment pair which is formed by a combination of the upper side and the corresponding lower side of a horizontal segment is determined (are treated as corresponding to each other).

Figure 9B:
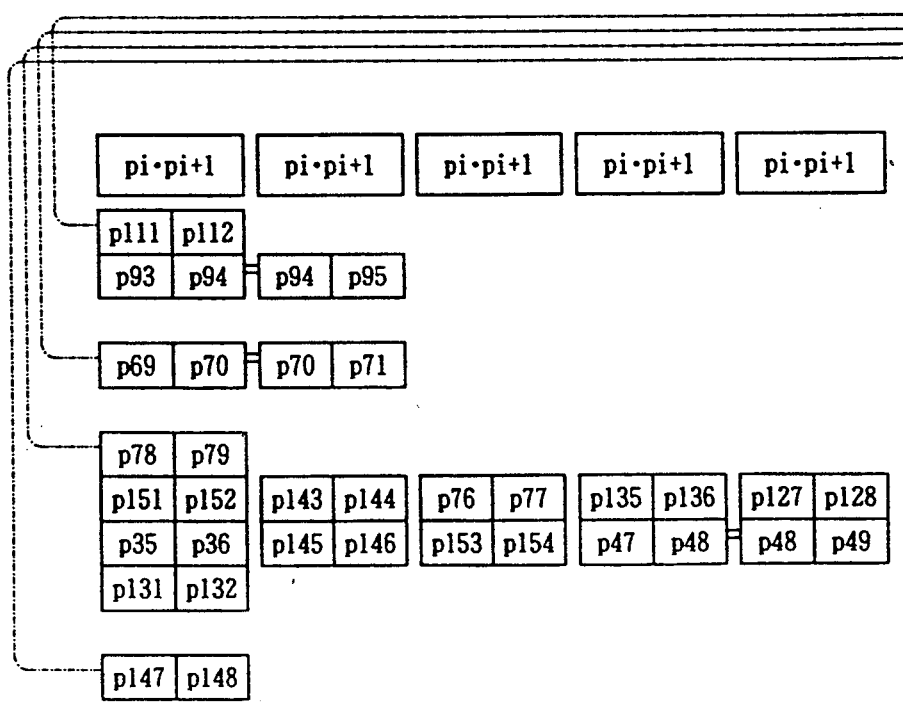
Figure 10A:
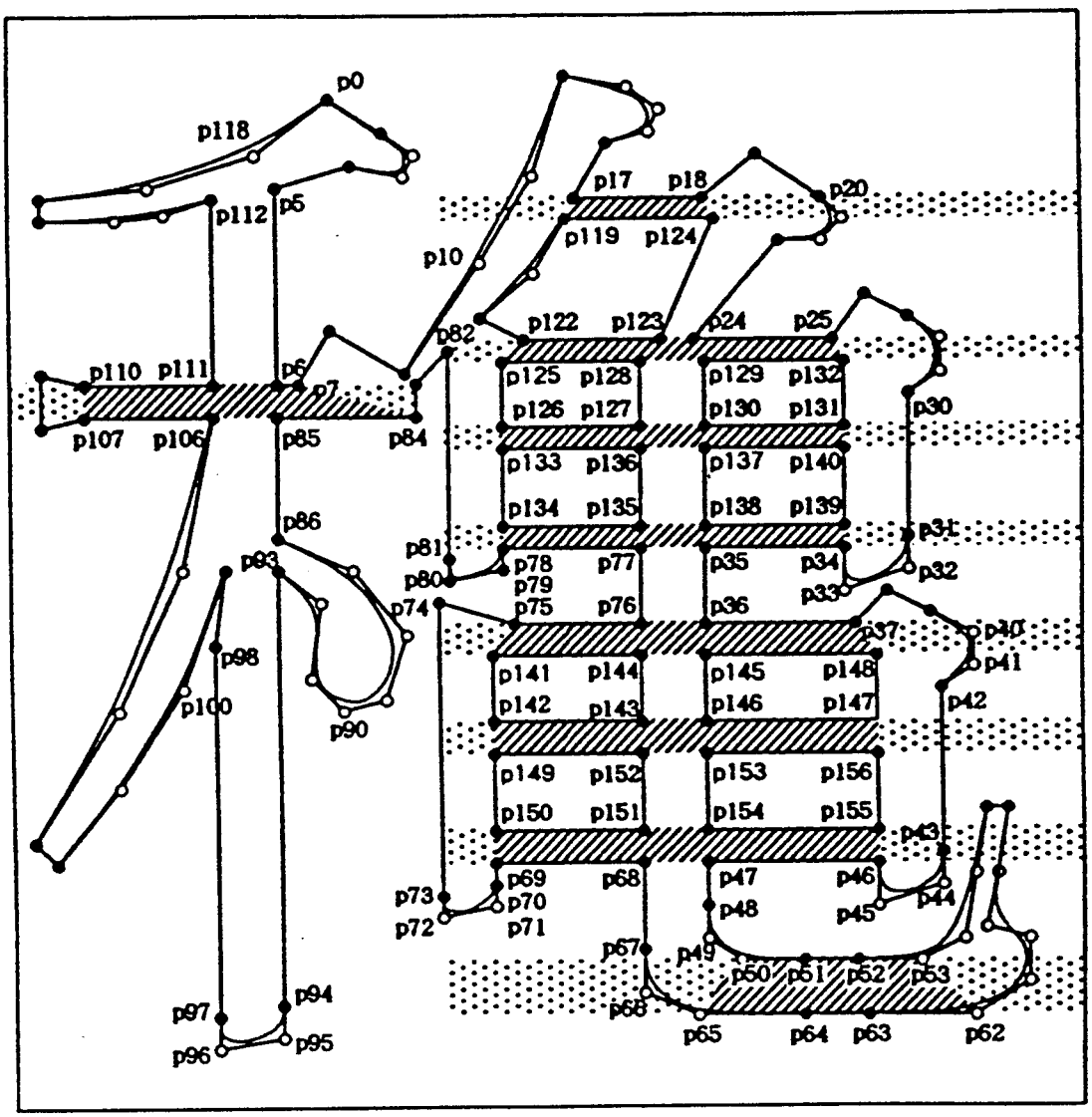
FIGS. 10A and 10B illustrate an example of a reflection of the character graphic which corresponds to FIGS. 9A and 9B.
Figure 10B:
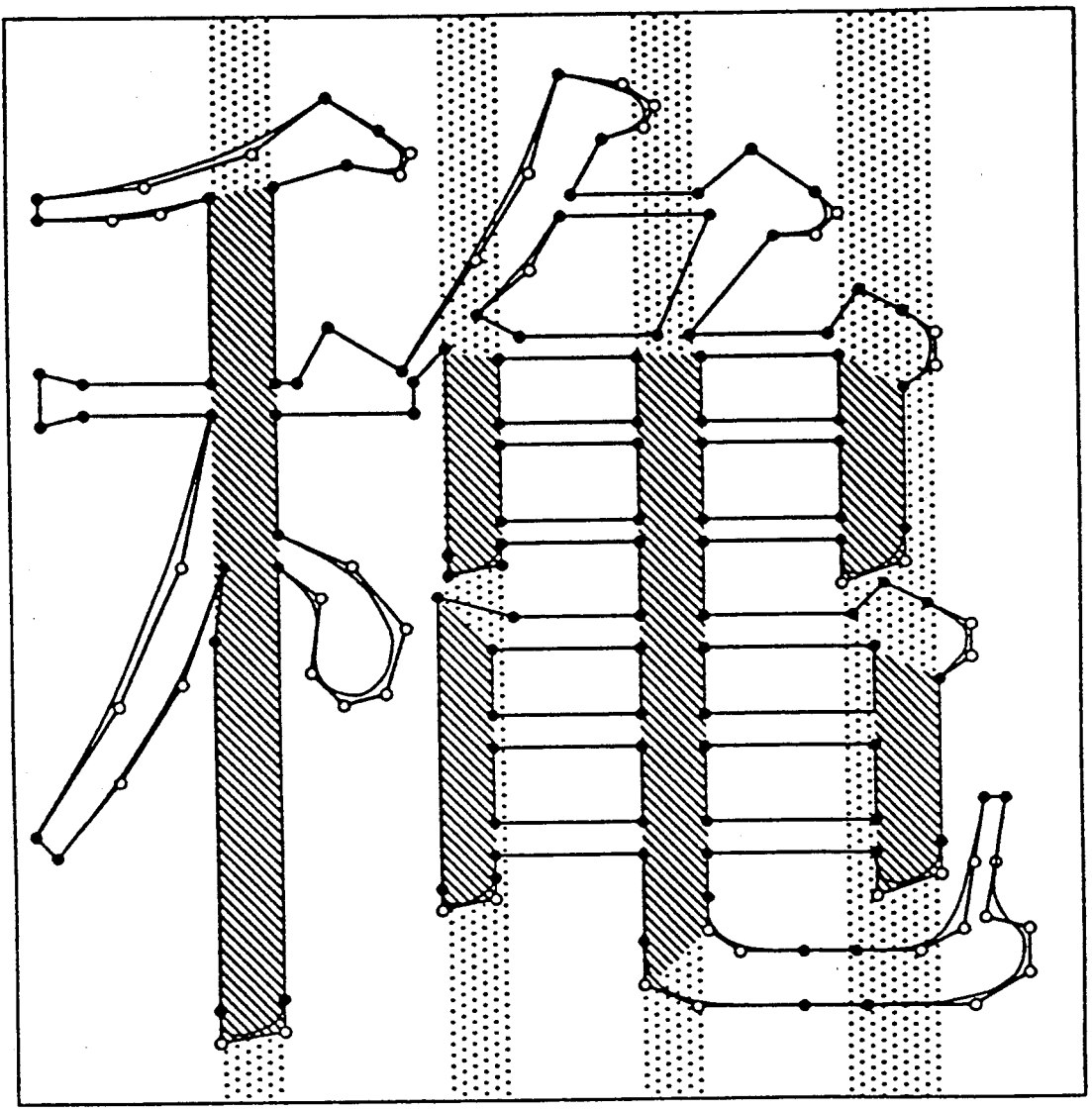

FIG. 9A illustrates an example of result of the determination of the horizontal segment of the character "飛," shown in FIG. 3A. FIG. 9B illustrates an example of the result of the determination of the vertical segment. In order to have the above-described concept understood easier, a corresponding example on the character graphic is shown in FIG. 10.

Step (8.4)

Horizontal Band Sorting

Each of the horizontal segment pairs determined in step (8.3) is subjected to a process in which their minimum value Emin of the X-coordinate and the maximum value Emax of the same are obtained.

Step (8.5)

Determination of Horizontal Band 0

As the initialization of this process, the horizontal segment pair having the minimum CLASS value is classified as horizontal band 0. (Emin, Emax) of this horizontal segment pair is made to be (Zmin, Zmax) which corresponds to the horizontal band 0.

Each of the horizontal segment pairs is determined as follows:

If Emin < Zmax, Zmin < Emax and as well as the result of the above-described determination is "YES", the following process is performed.

The subject horizontal segment pair is classified to band 0.

Zmin is substituted by the minimum value of (Zmin, Emin).

Zmax is substituted by the maximum value of (Zmax, Emax).

Step (8.6)

Determination of Horizontal Bands Ensuing Horizontal Band 1

If the result of the determination made in step (8.5) is "NO", it is classified as a novel band (band n+1 where predetermined band is n where n=0 or more).

As an initialization of band n+1, (Emin, Emax), which is the line segment pair is made to be (Zmin, Zmax) which corresponds to each band n+1.

All of the horizontal segment pairs are subjected to the above-described determination process. If the subject pair is not classified to the predetermined band n, novel band n+1 is formed.

Step (8.7)

Sorting of Horizontal Band Class

In order to apply the band to the entire body of the subject character in the process to be described later, rearrange the band classes in the ascending order of Zmin, the band classes being formed as a result of the processes performed before this step.

The specific result of the operation of the horizontal band of the character "  " shown in FIG. 3A is shown in FIG. 12. As horizontal ba Zmin=x107, Zmax=x84 are stored, while ZXmin=x69, ZXmax=x62 are stored as horizontal band 1, where x107<x84<x69<x62.

Step (8.8)

Application of Horizontal Band to Entire Body

The portion which has not been classified into any band exists in the process performed before this step. The above-described portion is assigned to the predetermined band. Accordingly, for example, the following process is performed.

The value of Zmin of band 0 is made to be x000 (expanded to the left end portion of the body).

The value of Zmax of the final band is made to be x999 (expanded to the right end portion of the body).

The value of Zmin of each of the bands except for band 0 is made to be (Zmax+1) of the band.

Step (8.9)

Setting of horizontal space region

Each band is subjected to a process in which the region (that is, the space region is the portion defined by subtracting the region which is formed by the line segment from the body region) with respect to the character segment other than the line segment pair and the space region (the other portion of the body, that is, the portion except for the character line forming portion assuming that the character graphic shown in FIG. 3A is an ordinary character), the process being performed as follows:

Insert y000 (the value of the uppermost portion of the body) into the leading portion of the class.

Insert y999 (the value of the lowermost portion of the body) into the end portion of the class.

Then, each two pieces are, starting form the leading portion of the class, set as space regions zsp0, zsp1, . . .

A specific result of the process in which the horizontal band BAND1 of the character "  " shown in FIG. 3A is processed will now be described.

With respect to horizontal line segment pairs zlp0, zlp1, zlp2, zlp3, zlp4, zlp5, zlp6 and zlp7, horizontal space regions zsp0, zsp1, zsp2, zsp4, zsp5, zsp6, zsp7 and zsp8 are set, where each of the line segment class includes the value of the corresponding class. However, the space region does not include the value of the corresponding class except for y000 and y999.

A specific result of processing the horizontal band BAND1 of the character "  " shown in FIG. 3A is as follows:

The values of the line segment pairs are:

y17<=zlp0<=y119, y24<=zlp1<=y125, y126<=zlp2<=y133, y134<=zlp3<=y34, y36<=zlp4<=y141, y142<=zlp5<=y149, y150<=zlp6<=y46 and y50<=zlp7<=y62.

The values of the space region are:

y000<=zsp0<y17, y119<=zsp1<y24, y125<=zsp2<y126, y133<=zsp3<y134, y34<=zsp4<y36, y141<=zsp5<y142, y149<=zsp6<y150, y46<=zsp7<y50 and y62<=zsp8<y999.

That is, the values of the space region are:

y000<=zsp0<=y17−1, y119+1<=zsp1<=y24−1, y125+1<=zsp2<=y126−1, y133+1<=zsp3<=y134−1, y34+1<=zsp4<=y36−1, y141+1<=zsp5<=y142−1, y149+1<=zsp6<=y150−1, y46+1<=zsp7<=y50−1 and y62+1<=zsp8<=y999.

Setting of Skip Order at the Time of Low Pixel

Because of the following reason, the skipping order at the time of the low pixel (hereinafter called a "skipping order") is set in the flow chart shown in FIG. 5. Concept of Setting of Skipping Order at the time of Low Pixel Now, it will now be described with reference to a case of horizontal band BAND1 of the character "  " shown in FIG. 3A.

There 8 horizontal segment pairs and 9 horizontal space regions (n=the number of the horizontal segment pairs+1) in horizontal band BAND1. That is, in a case where a portion "  " (usually called "the right-hand radical" of a Chinese character) of the character "  " shown in FIG. 3A is reproduced (or expressed) as a bit map, it is necessary to have 17 (the number of the horizontal line segment pairs+the number of the horizontal space regions) pixels (which is called "MINPIX" which is the minimum number of the reproducible pixels in each horizontal band) to dispose each horizontal pixel at intervals of one pixels.

On the contrary, if the Y-directional number of the pixels assigned is 16 or less when the subject character is output, a certain degree of deformation of the character will take place or the space between two lines will become oblique. On the other hand, in the above-described case where a CRT of 100 DIP is used and as well as 10-point, which is an ordinary font size for use in the text of a treaty, characters are displayed in the WYSIWYG manner, the pixel size allowed for one character is 14 (=13.89), while 17 (=16.67) is allowed in a case of 12-point fonts.

That is, the portion of the above-described " 釡 " will necessarily encounter the deformation in a case point size smaller than 14 points. Therefore, as means for overcoming the above-described problem, the skipping order at the time of a low pixel (hereinafter called a "skipping order") is set in order to minimize the deformation within the visible degree for an operator even if the above-described deformation of the character necessarily takes place.

FIG. 16 illustrates a method of assigning pixels to the portion " 釡 " in the case where the pixel size is 17 or less. The following process is performed in order to obtain the output as shown in FIG. 16.

The skipping order the detail of which is shown in the flow chart shown in FIG. 11 is set through the following steps:

Initialization (initialization of skipping order variable ZEP);
setting of the skip region given the first priority;
setting of the skip region given the second priority;
setting of the skip regions given the third and ensuing priorities; and
setting of the skipping order of the corresponding line segment sets.

Then, the setting of the skipping order at the time of a low pixel will now be described with reference to the flow chart shown in FIG. 11.

Step (11.1)

Initialization

Skipping order variable ZEP is initialized (ZEP=-MINPIX).

Step (11.2)

Setting of Skip Region Given the First Priority

A determination is made that whether or not character form segment other than the horizontal segment (hereinafter called a "line segment") is present in the uppermost horizontal space region and the lowermost horizontal space region. In accordance with the result of the determination, the following process is performed:

In a case where the above-described character form segment other than the line segment is present in both the two space regions or is not present in the same, the ZEP value is set to the smaller space region (the difference in the corresponding class) and the ZEP value is decreased by 1 (ZEP=ZEP−1). Then, the ZEP value is set to the larger space region and the ZEP value is decreased by 1 (ZEP=ZEP−1).

In a case where the character form segment other than the line segment is present in either of the two space regions, the ZEP value is set to the space region in which the same is not present and the ZEP value is decreased by 1 (ZEP=ZEP−1). Then, the ZEP value is set to the space region in which the same is present and the ZEP value is decreased by 1 (ZEP=ZEP−1).

Step (11.3)

Setting of Skip Region Given the Second Priority

Then, the space region to be subject to a comparison is translated to the most central position of the character body. There are two cases that one space region is present at the most central position of the character body and that two space regions are present in the same (in a case of the horizontal band BAND1 of the character " 釡 ", there is only one horizontal space region zsp4 at the most central position of the character body).

In the case where only one space region is present, the ZEP value is set to the corresponding space region and the ZEP value is decreased by two (ZEP=-ZEP−2).

In the case where there are two space regions, the ZEP value is set to the smaller space region (in terms of the difference in the corresponding class) and the ZEP value is decreased by 2 (ZEP=ZEP−2).

Then, the ZEP value is set to the larger space region and the ZEP value is decreased by 2 (ZEP=ZEP−2).

Step (11.4)

Sequentially Setting the Skip Regions Given the Third and Ensuing Priorities

Then, the space regions to be subject to the comparison are sequentially translated in the direction of the outside the character body so as to set the ZEP value to all of the space regions as follows:

The ZEP value is set to the smaller space region (the difference between the corresponding classes) and the ZEP value is decreased by 2 (ZEP=ZEP−2).

Then, the ZEP value is similarly set to the larger space region and the ZEP value is decreased by 2 (ZEP=ZEP −2).

Step (11.5)

Set Skipping Order to Corresponding Line Segment Pair

Each of the space region and the line segment adjacent (at the rear of) to this space region are combined to form a group and the same skipping order as that for the space region which forms the group is set to each of the line segment pair.

However, the leading (the uppermost) space region and the final (the lowermost) space region are not made to be the subject of the group formation.

In this state, the leading line segment pair has not been given the skipping order as a result of the above-described process. However, since its skipping order value ZEP is always 1, this value is set. Then, each of the bands is subject to the above-described steps so as to set the skipping order to all of the space regions.

Figure 12A:
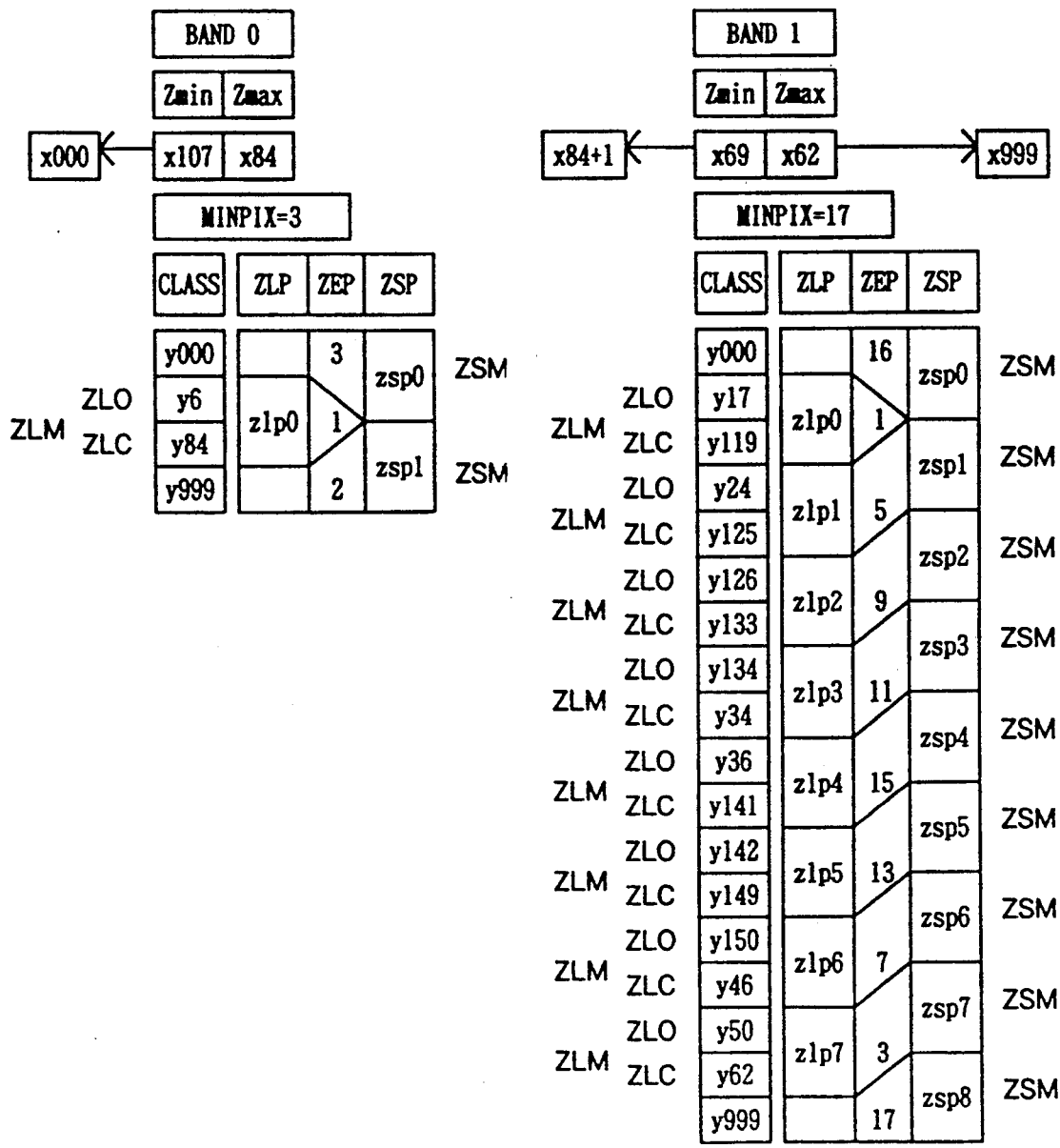
FIGS. 12 and 12B illustrate band data about " 機 "
Figure 12B:
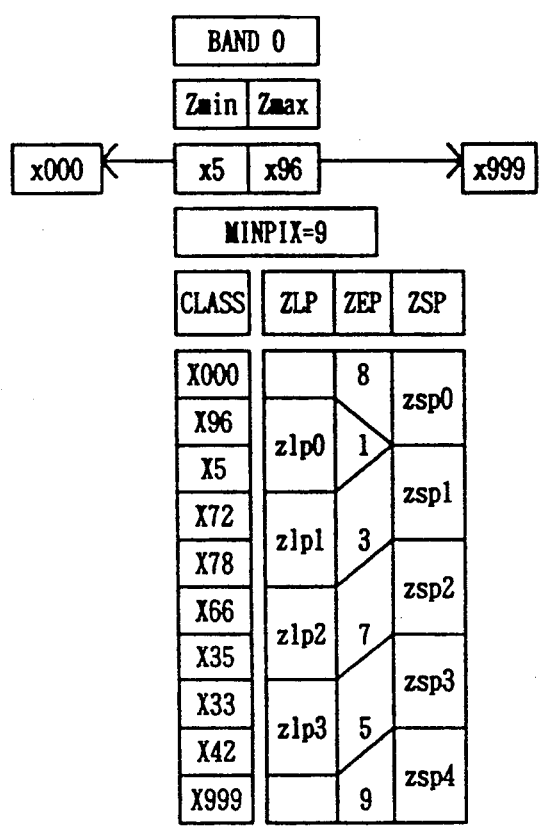

The result of the above-described processes subjected to the horizontal band of the character " 釡 " is shown in FIG. 12A. The same subjected to the vertical band is shown in FIG. 12B.

Storage of Character Data for Bit Map Conversion

Band information processed for each of the coordinate segment through the above-described steps is added. Then, similarly to the reference character data, it is stored in the FDT2 denoted by reference numeral 2 shown in FIG. 2 together with a font index to be described later and acting to read information in units of a character. The method of storing the character data for bit map conversion will now be described with reference to FIG. 14.

Figure 14A:
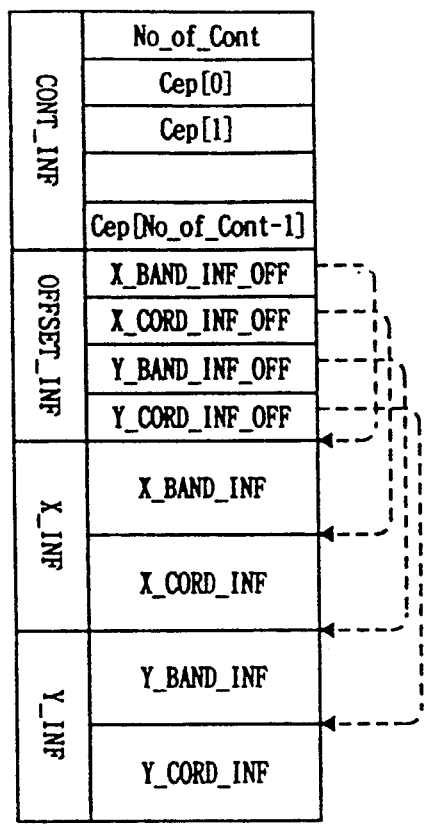

As shown in FIG. 14, the methods of storing the character data for the bit map conversion are classified into outline information CONT_INF, offset information OFFSET_INF, X-coordinate information X_INF and Y-coordinate information Y_INF.

Outline Information (CONT_INF)

Offset information is composed of four offset pointers showing data offset of each coordinate data to be described later, the four offset pointers being X_BAND_INF_OFF, X_CORD_INF_OFF, Y_BAND_INF_OFF and Y_CORD_INF_OFF. The offset point X_BAND_INF_OFF is an offset pointer showing the leading offset of band information of the X-coordinate to be described later.

X_CORD_INF_OFF is an offset pointer showing the leading offset of information of the control point of the X-coordinate to be described later.

Y_BAND_INF_OFF is an offset pointer showing the leading offset of band information of the Y-coordinate to be described later.

Y_CORD_INF_OFF is an offset pointer showing the leading offset of information of the control point of the Y-coordinate to be described later.

Coordinate Information (X_INF, Y_INF)

As for coordinate information, X-coordinate information X_INF and Y-coordinate information Y_INF are individually provided. Since each of the two information items has the same structure, they can be treated by the same process only by changing the coordinate component on the program. Each of the coordinate information is composed of band information BAND-INF and control point information CORD-INF. As described above, since the X-coordinate information and the Y-coordinate information are structure similarly, description will be made about the Y-coordinate information.

Band Information (BAND_INF)

Figure 14B:
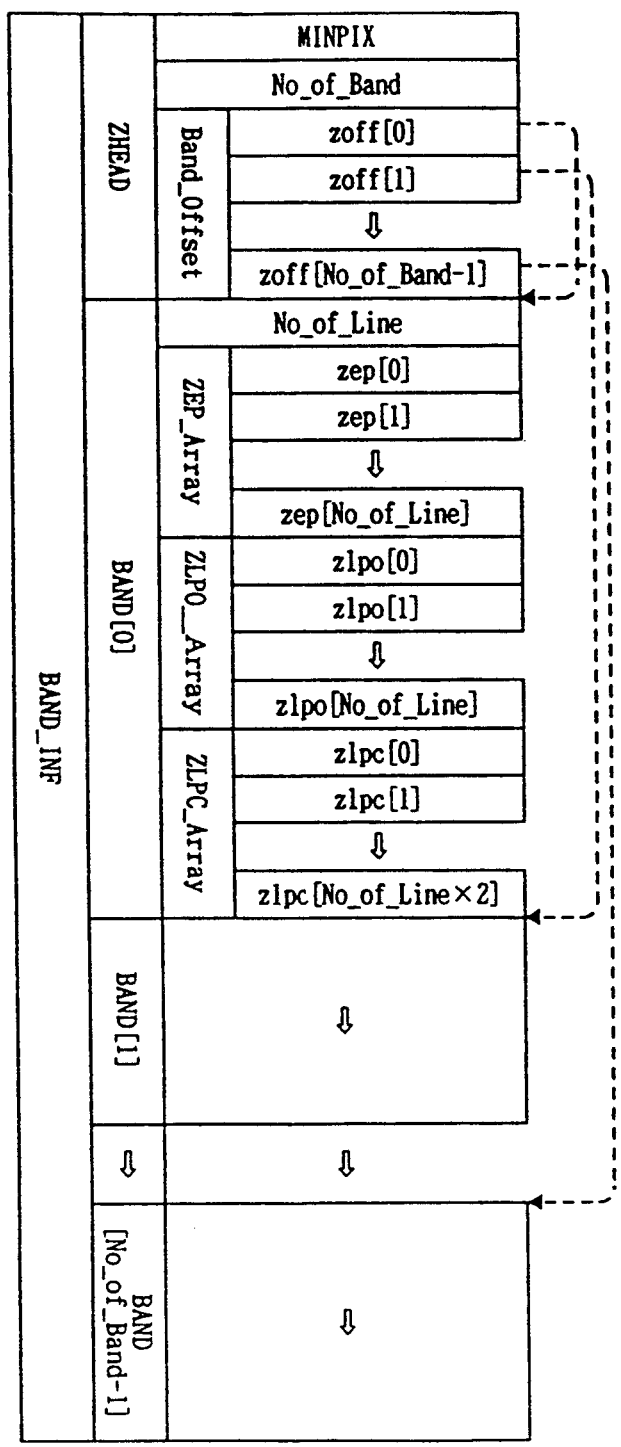

As shown in FIG. 14B, band information BAND_INF defines one or more bands.

MINPIX stores the maximum value of the smallest reproduction pixel determined in each band. No_of_Band is the number of information items for treating a plurality of band information items and Band_Offset is an offset pointer.

Band (BAND)

Each band is a variable length band.

No_of_Line stores the information about the number of line segments present in each band.

ZLPO_Array denotes the skipping order at the time of a low pixel in which a configuration of (No_of_Line+1) pieces is realized.

ZLPC_Array stores the value of Class in which a configuration of (No_of_Line×2+1) pieces is realized.

Control Point Information (CORD_INF)

The structure of CORD_INF is shown in FIG. 14C. FIG. 15 illustrates a portion of specific control point information with reference to an example of the character " 程 ".

Control point information has, at each control point for expressing the subject character, band No. Band_NO, class No. Line_SEQ and attribute flag REG_F.

Attribution Flag REG_F

Attribution flag REG_F is additional information for causing control point information, which is made coincide with the resolution of the output device to be described later, to be efficiently processed while maintaining satisfactory quality. The attribute flag REG_F records copy attribute CPY, class attribute ZLO, ZLC, ZLM, ZSM, corrective attribute ADG and curve attribute CvC.

The horizontal segment of attribute flag REG_F will now be described.

Copy Attribute CPY

It denotes a fact that it has the same coordinate value as that of the control point positioned at the front of it. That is, this attribute is added to the control point $pk+1$ which is the result of the extraction of $(pk \cdot pk+1)$ in which $dy=0$ as described in step (8.1).

Class Attribute ZLO

It denotes a fact that it has reference line segment value. That is, this attribute is added to $(pk \cdot pk+1)$ in which the sign of dx is positive in the above-described CLASS configuration. For example, in a case shown in FIG. 9A and 12A, it is exemplified by y17, y24, y6, y126 and y134.

Class Attribute ZLC

It denotes a fact that it has relative line segment value. That is, this attribute is added to $(pk \cdot pk+1)$ in which the sign of dx is negative in the above-described CLASS configuration. For example, in a case shown in FIG. 9A and 12A, it is exemplified by y119, y125, y84, y133 and y24.

Class Attribute ZLM

It denotes a presence in a region between the reference line segment value and the relative line segment value. That is, this attribute is added to pk in which the coordinate value pk (y) of the control point holds a relationship (the ZLO value at the front position)<pk (y) <(the ZLC value at front position).

Class Attribute ZSM

It denotes a presence in a region between the relative line segment value and the reference line segment value. That is, this attribute is added to pk in which the coordinate value pk (y) of the control point holds a relationship (the ZLC value at the front position)<pk (y) <(the ZLO value at front position).

Corrective Attribute ADG

This attribute is added to $(pk \cdot pk+1)$ which does not belong to the above-described CLASS configuration but in which $dy=0$.

Curve Attribute CVC

Curve attribute CVC is similar to the attribute information C about the above-described reference character data. It shows the fact that each control point P shows the end point of the straight portion of the character or the control point for the curve correction to be described later.

Output of Bit Map Character

Figure 13:
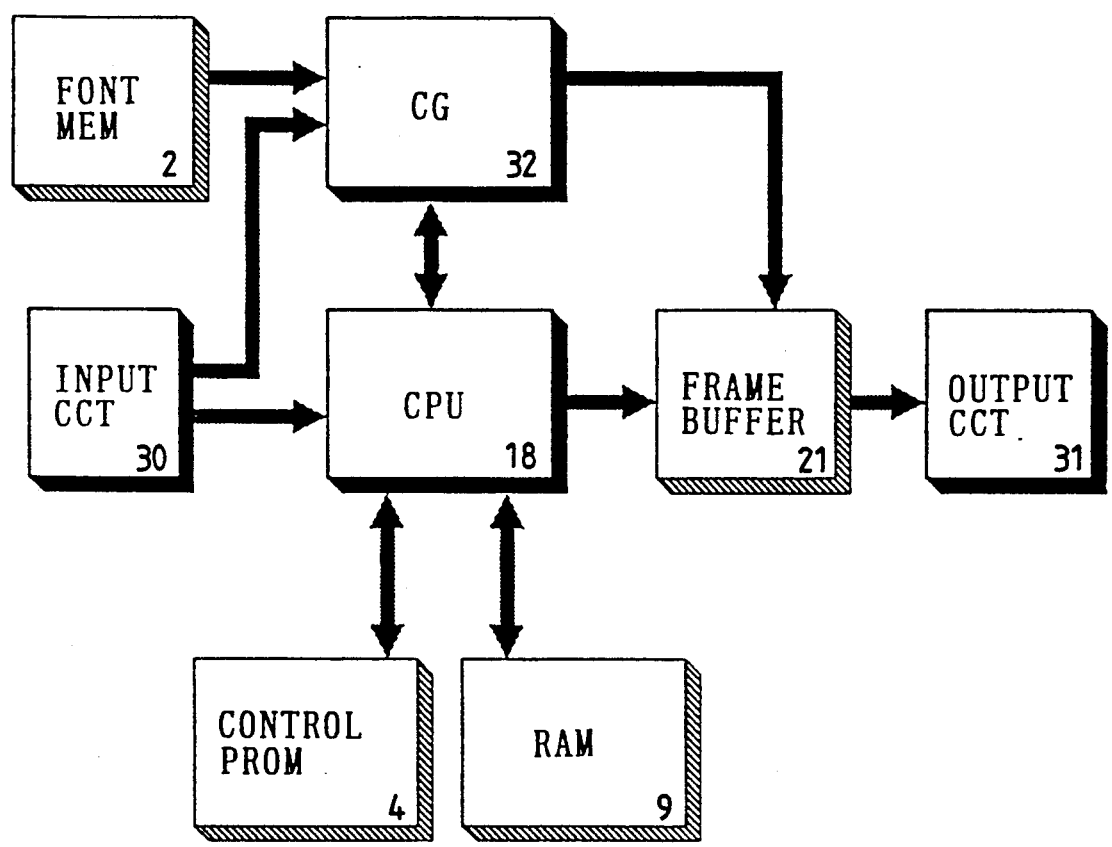
FIG. 13 is a structural view which illustrates a character processing apparatus portion of the system according to the present invention.

FIG. 13 is a structural view which illustrates a character processing apparatus portion for converting character data for the bit map conversion processed ad described above into bit map data at the resolution of the specified output device and in accordance with the specified font size so as to output it.

Figure 17:
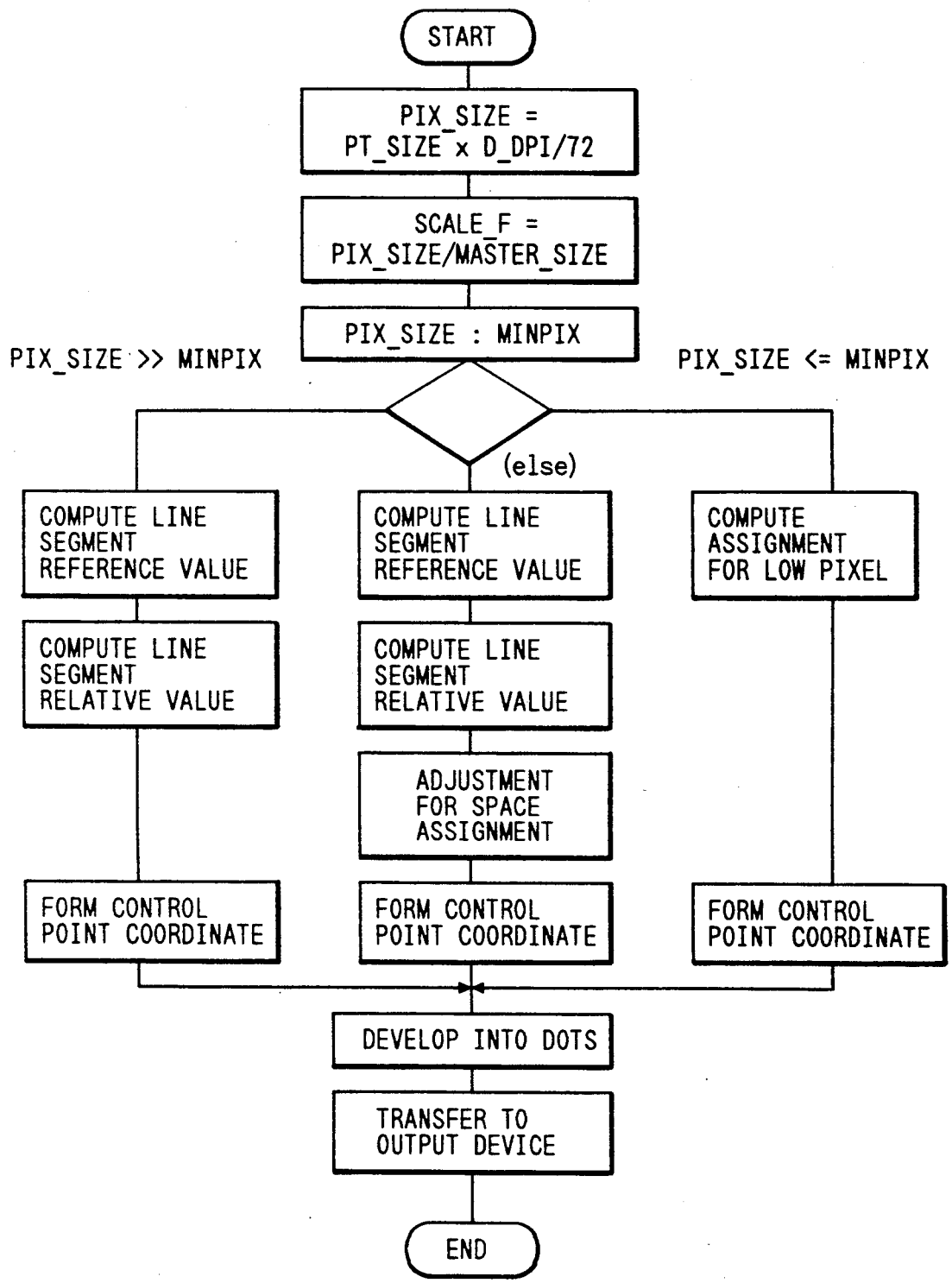
FIG. 17 is a flow chart which illustrates an output of the bit map character.

FIG. 17 is a flow chart of the operation of a character generating portion to be described later when it outputs the bit map character.

Referring to FIG. 13, reference numeral 18 represents a CPU and 4 represents a control ROM in which the CPU and a program for the character processing apparatus for controlling the system are stored. Reference numeral 32 represents a character generating portion CG which acts when the above-described program outputs the bit map character. Reference numeral 9 represents a RAM and 2 represents a font memory in which font data is stored or a RAM including an external storage device. Reference numeral 30 represents a key board denoted by reference numeral 6 shown in FIG. 1 or an input circuit which corresponds to the portion which receives data supplied from the document file storage region and stored in the disk apparatus denoted by reference numeral 5 shown in FIG. 1. Reference numeral 21 represents a frame buffer for storing image data to be output, the image data being stored in the form of bit data. Reference numeral 31 represents an output circuit which corresponds to an output circuit of a video signal for a printer or a CRT display circuit, the output circuit 31 establishes a connection with a visible image output device such as a printer and a CRT. The above-described reference numerals used in the structure shown in FIG. 13 are made coincide with those of the structure shown in FIG. 1. However, the input circuit 30 and the output circuit 31 shown in FIG. 13 are omitted from the structure shown in FIG. 1.

Font Data

The above-described character data for the bit map conversion is treated as font data to be described later so as to be administrated as a set of a plurality of characters. That is, font data is composed of a font index, a code index and individual character data for the bit map conversion. The font index is index information for administrating fonts for each face and character set (in a case of a Japanese character set, JIS first level, second level, character type set individually provided for the system and the like).

According to this embodiment, also font coordinate system information of the character data for the bit map conversion is administrated in units of fonts.

The code index stores the character code for each font, the leading portion of character data for the bit map conversion to be described later and the data length. As described with reference to FIGS. 14 and 15, the character data for the bit map conversion stores, for each character, coordinate information composed of outline information, offset information, band information and control point information. A control means for the character processing apparatus portion of this system is stored in the PRG2 denoted by reference numeral 4 shown in FIG. 1 as a software program. It is loaded in the PRAM 2 denoted by reference numeral 8 in response to a command supplied from the KBD denoted by reference numeral 6 so as to be sequentially controlled by the CPU 18.

Furthermore, all of intermediate data items required when the characters are generated are temporarily stored in the DARAM 9 shown in FIG. 1.

Input Parameter

When a certain character is output to a visible image output device such as a CRT, the following character output command is issued through the input circuit:

Character output command = {command for each output device, font size, type of font and type of the output character}

The command for each output device is used to specify the resolution of the visible image output device such as the printer or the CRT denoted by 14, 15, 16 and 18 shown in FIG. 1. The resolution of the specified output device can be obtained by making a reference to an output device/resolution correspondence table, which has been set in a SYSROM 22 shown in FIG. 1. The actual value stored in the above-described correspondence table is, for example, the number of DPI.

It is preferable that the character size be an ordinary size which does not depend upon the resolution of the output device when specified characters are output. For example, it is specified by, for example, point size (according to this embodiment, 1 point is 1/72 inches). The type of the font is used to specify the above-described character face or the character set with which the above-described font index is made reference. The type of the output character is a character code for making a reference to the above-described code index.

Calculation of Output Dot Size

After the type of the output device, the font size and the type of the font have been specified through the input circuit, the dot size with which the specified character size is actually developed at the resolution of the specified output device is calculated. Assuming that the specified character size is PT_SIZE, the resolution of the specified output device is D_DPI and the dot size to be actually developed is PIX_SIZE, $$PIX\_SIZE = PT\_SIZE \times D\_DPI/72$$

Since PIX_SIZE is the dot size of the output device, the result of the right side of the equation is made to be an integer by, for example, the half-adjust.

As a result, the value of PIX_SIZE is, assuming that the resolution D_DPI of the output device is 400, 178 in a case where the character size is 32 points, 89 in a case where the character size is 16 points, 67 in a case where the character size is 12 points and 56 in a case where the character size is 10 points. Assuming that D_DPI = 100, the value of PIX_SIZE is 44, 22, 17 and 14.

Master Font Size

A master font index, to be described later, for the corresponding font data is obtained from the font index in accordance with the specified type of the font. Then, an enlargement ratio and the contraction ratio with respect to PIX_SIZE can be calculated. When an output is made, the required information about the font coordinate system is, for example, the coordinate value of the upper left origin O shown in FIG. 2 and that of the lower right body diagonal point Z. In a case where the coordinate system is defined as shown in FIG. 2, the size of character data for the bit map conversion is the value of Z, that is (x999, y999) while setting the value (x000, y000) of the upper left origin O to be (0, 0).

Calculation of Enlargement Ratio and Contraction Ratio

Assuming that the above-described master font size is MASTER_SIZE and the enlarge or contraction ratio is SCALE_F,

SCALE_F=PIX_SIZE/MASTER_SIZE

It is usually necessary for the value of SCALE_F to be obtained to a level lower than the decimal point. Therefore, it is calculated as a floating-point variable or a fixed point variable subjected to a bit shift so as to obtain an accuracy of two places of decimals in the decimal notation.

Processing of Control Point Information

The character data for the bit map conversion is obtained in accordance with the specified type of the font and the type of the output character by using the font index and the code index. Then, information about the outline control point (hereinafter called a "output resolution coincidence control point") is processed, the information being made coincide with the resolution of the output device for transmitting the character data to a dot development circuit to be described later. It is preferable that the dot development circuit be a simple circuit, for example, a bit map solid circuit. The degree of the visual quality of the output character at the specified font size is controlled by forming the output resolution coincidence control point while the calculation by using the above-described enlargement and contraction ratio SCALE_F. This process can be performed in such a manner that information about the X control point and that about the Y control point are processed individually by the same structure. The X and Y can be extinguished from each other simply by mainly changing the coordinate factor of the control point information.

Then, the above-described fact will now be described with reference to an example of the Y coordinate information.

As described above, character data for the bit map conversion, in units of a character, stores outline information, offset information and coordinate information. As shown in the flow chart shown in FIG. 17, the result of a comparison made between the minimum reproducible pixel MINPIX (the value of MINPIX is different for each character) and dot size PIX_SIZE to be actually developed is discriminated. In accordance with the result, the most suitable process is selected.

That is, information about the control point is individually processed depending upon the case where PIX_SIZE is sufficiently large with respect to MINPIX (for example, PIX_SIZE> =MINPIX×5), the case where PIX_SIZE is MINPIX or less and the other cases.

Then, description about each condition will now be made.

In a Case Where PIX_SIZE is Sufficiently Large With Respect to MINPIX

It can be exemplified by case where a character larger than 32 points is output through a printer of a resolution of 400 DPI (PIX_SIZE=32×400/72=178).

Calculation of Member of Band and Class Configuration

Each character has one or more bands which must be individually subjected to the classification of the class configuration as follows:

Calculation of Reference Line Segment Value

Figure 18:
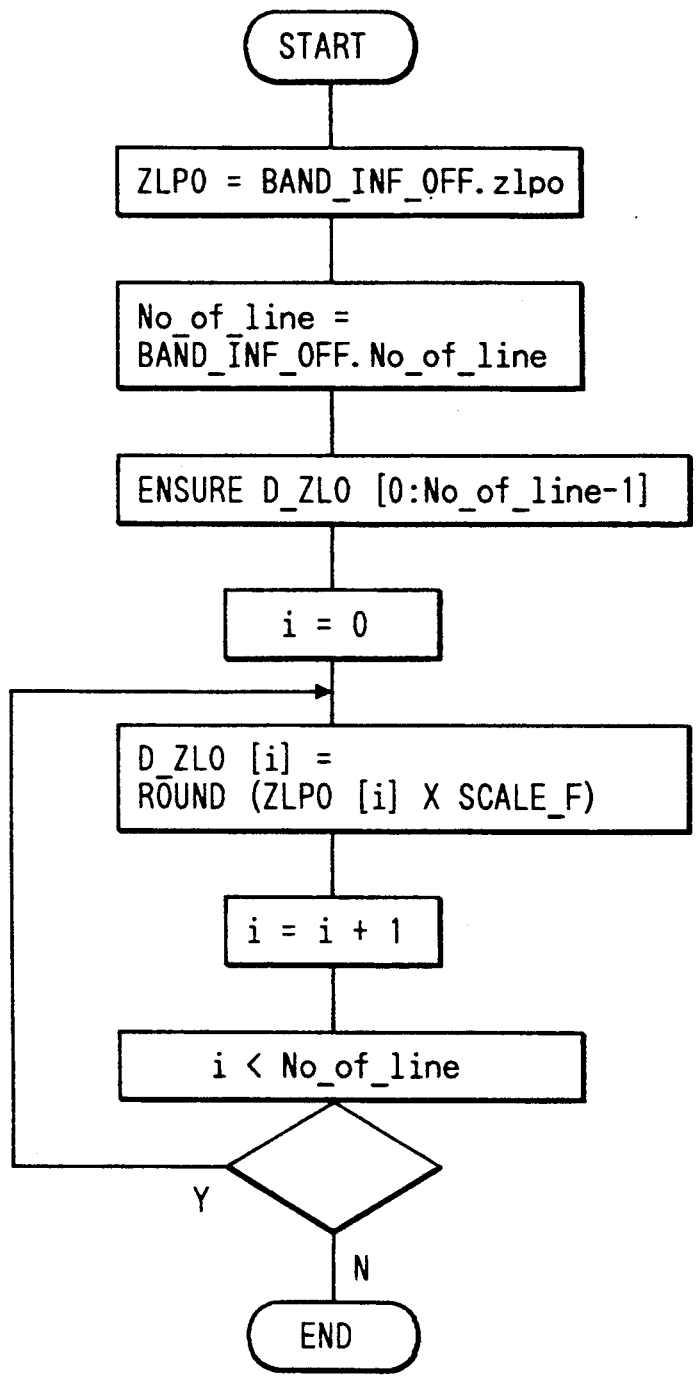
FIG. 18 is a flow chart which illustrates a process of calculations performed for obtaining a reference line segment value.

FIG. 18 illustrates a flow chart about the calculation of the reference line segment value. Then, description will be made with reference to FIG. 18.

Configuration D_ZLO [0: No_of_Line−1] for the calculation result is secured on the DARAM. An assumption is made here that configuration ARRAY [a:b] is a configuration named ARRAY in which configuration elements are arranged from a to b, where a and b respective are integers holding a relationship a<=b.

D_ZLO [i]=ROUND (ZLPO [i]×SCALE_F)

(i=0 to No_of_Line−1)

The value of ZLPO [No_of_Line] is not necessary for this process.

ROUND (n) is a function for causing variable n to be the same as an integer which approximates n. For example, it is a function for making an integer by half-adjusting decimal point and on.

Calculation of Relative Line Segment Value

Figure 19:
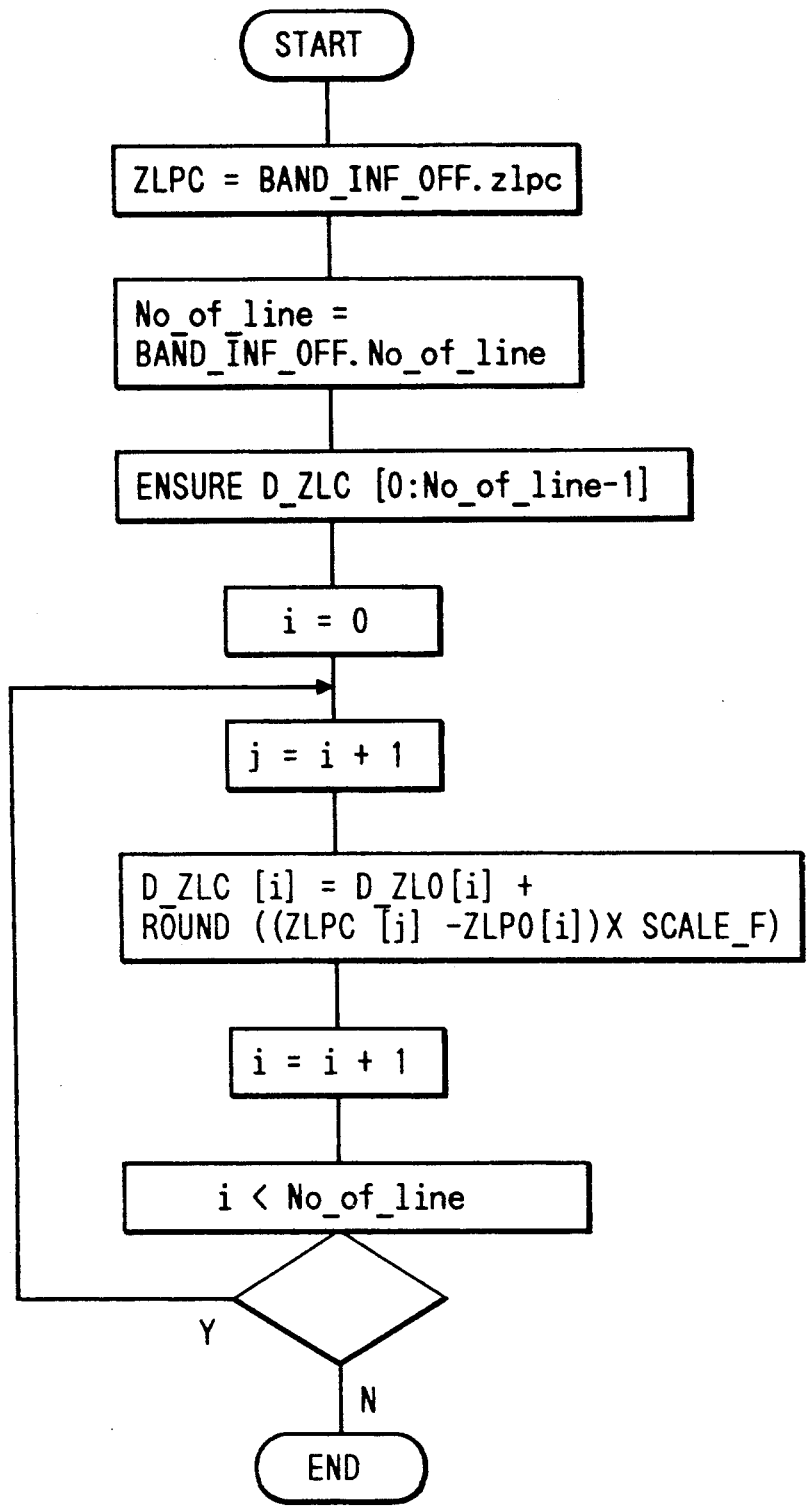
FIG. 19 is a flow chart which illustrates a process of calculations performed for obtaining a relative line segment value.

FIG. 19 is a flow chart about the calculation of the relative line segment value. Then, description will now be made with reference to FIG. 19.

Configuration D_ZLC [0: No_of_Line−1] for the calculation result is secured on the DARAM.

D_ZLC [i]=D_ZLO [i]+ROUND ((ZLPC [j]−ZLPO [i])×SCALE_F)

(i=0 to No_of_Line−1, j=i+1)

The value of ZLPC [0] is not necessary for this process.

Figure 21B:
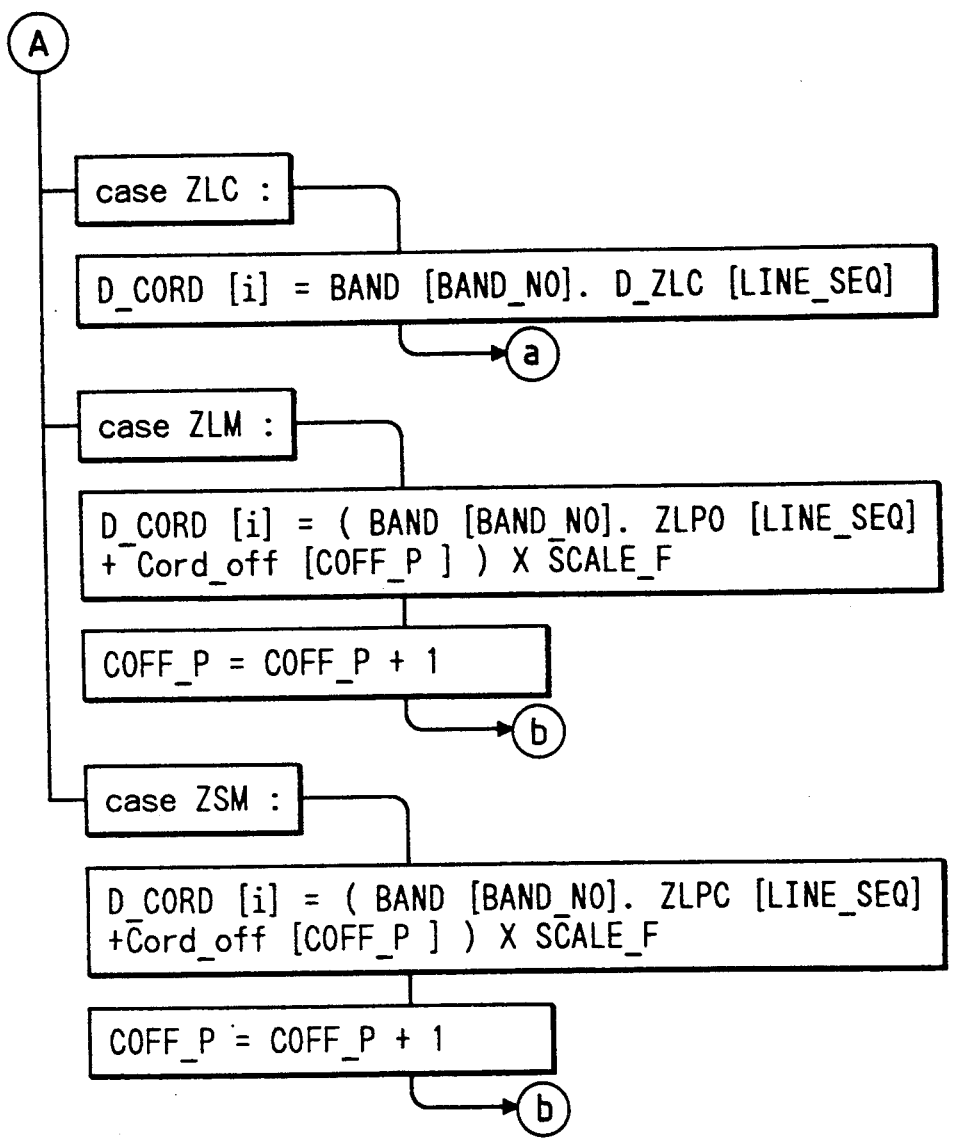
FIG. 21, consisting of FIGS. 21A and 22B is a flow chart which illustrates a process of calculations performed for obtaining the coordinate value of the control point from a control point information configuration.

Processing of Coordinate Value of Control Point from Control Point Information Configuration FIG. 21 is a flow chart about the process of forming the coordinate value of the control point from the control point information configuration. Now, description will now be made with reference to FIG. 21.

Configuration D_CORD [0: No_of_Cp−1] for storing the result of the calculation of the output resolution coincidence control point is secured on the DARAM.

Pointer COFF_P of the offset coordinate value configuration for the control point which does not belong to the line segment pair is set.

If the value of REG_F is CPY, a fact is shown that the value is the same as the forward control point, that is, D_CORD [i]=D_CORD [i−1]

If the value is ZLO, a fact is shown that the reference line segment value is possessed, that is, D_CORD [i]=BAND [BAND_NO].

D_ZLO [LINE_SEQ]

If the value is ZLC, a fact is shown that the relative line segment value is possessed, that is, D_CORD [i]=BAND [BAND_NO].

D_ZLC [LINE_SEQ]

If the value is ZLM, a fact is shown that it is present in a region between the reference line segment value and the relative line segment value, that is, D_CORD [i]=BAND [BAND_NO].

ZLPO [LINE_SEQ]+Cord_off

[COFF_P]×SCALE_F

COFF_P=COFF_P+1.

If the value is ADG,

D_CORD [i]=ROUND (D_CORD [i])

If the value is ZSM, a fact is shown that it is present in a region between the relative line segment value and the reference line segment value, that is, D_CORD [i]=BAND [BAND_NO].

ZLPC [LINE_SEQ]+Cord_off

[COFF_P]×SCALE_F

COFF_P=COFF_P+1.

If the value is ADG,

D_CORD [i]=ROUND (D_CORD [i])

A case where PIX_SIZE is MINPIX or less corresponds to a case where a character of 10 point size is output through a printer of a resolution of 100 DPI (PIX_SIZE=10×100/72=14).

Calculation of Allocation at the Time of Low Pixel

Figure 22B:
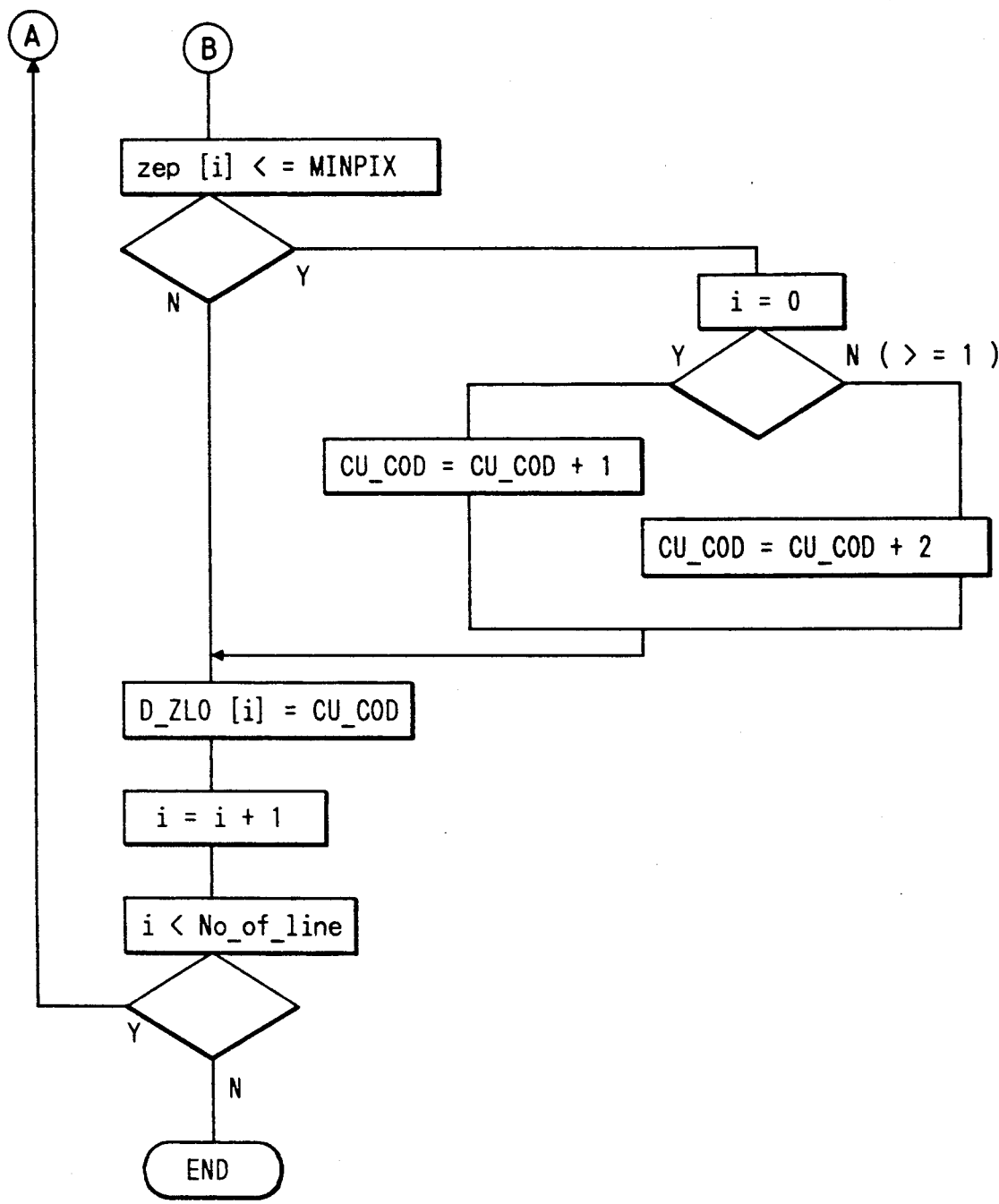
FIG. 22, consisting of FIGS. 22A and 22B is a flow chart which illustrates a process of calculations performed for allocating at the time of a low pixel.

FIG. 22 is a flow chart about the calculation for the allocation to be performed at the time of a low pixel. Then, description will be made with reference to FIG. 22.

Two configuration for the result of the calculations D_ZLC [0: No_of_Line] and D_ZLO [0: No_of_Line] are secured on the DARAM.

Allocation value variable CU_COD is initialized (CU_COD=0).

As for i which meet i=0,

D_ZLC [i]=CU_COD

In a case where zep [i]<=MINPIX,

CU_COD=CU_COD+1

D_ZLO [i]=CU_COD

Furthermore, as for i which meets i=1 to No_of_Line −1,

D_ZLC [i]=CU_COD

In a case where zep [i]<=MINPIX,

CU_COD=CU_COD+2

D_ZLO[i]=CU_COD

A specific example of the above-described result will now be described with case where PIX_SIZE is 13. The values of D_ZLC [0:8] are respectively assigned to 0, 0, 2, 4, 6, 6, 8, 10 and 12. The values of D_ZLO [0: 8] are respectively assigned to 0, 2, 4, 6, 6, 8, 10, 12 and 12.

FIG. 16 illustrates the portion " ✝ " of the horizontal band 1 of the character " 社 " in a case PIX_SIZE is 17 or less.

Figure 23B:
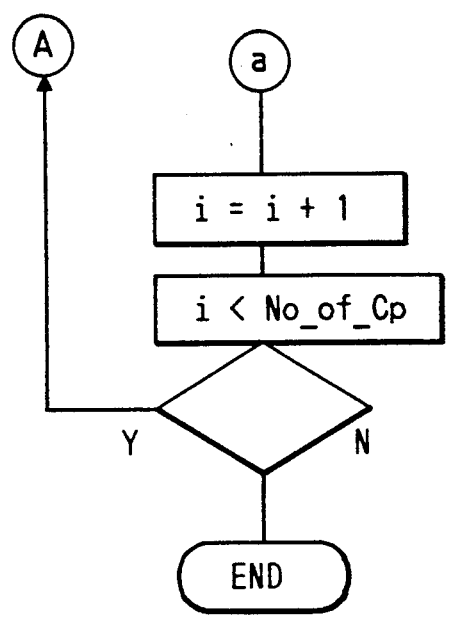
FIG. 23, consisting of FIGS. 23A and 23B is a flow chart which illustrates a process of calculations performed for obtaining the coordinate value of the control point from the control point information configuration.

Processing of Coordinate Value of Control Point from Control Point Information Configuration FIG. 23 is a flow chart about the calculation of processing the coordinate value of the control point from the control point information configuration. Then, description will be made with reference to FIG. 23.

Configuration D_CORD [0: No_of_Cp−1] for the result of calculating output resolution control point is prepared.

If the value of REG_F is CPY, D_CORD [i]=-D_CORD [i−1].

If the same is ZLO,

D_CORD [i]=BAND [BAND_NO].

D_ZLO [LINE_SEQ]

If the same is ZLC, it is the same as ZLO.
If the same is ZLM, it is the same as ZLO.
If the same is ZSM, D_CORD [i]=[BAND_NO].

D_ZLO [LINE_SEQ]+BAND
  [BAND_NO]·D_ZLC [LINE_SEQ])/2

ADG is not necessary for this process.

T case where PIX_SIZE is the others (for example, it is larger than MINPIX and as well as smaller than MINPIX ×5) corresponds to a case a character of 12 point size is output through a printer of a resolution of 400 dpi (PIX_SIZE=12×400/72=67).

Figure 20:
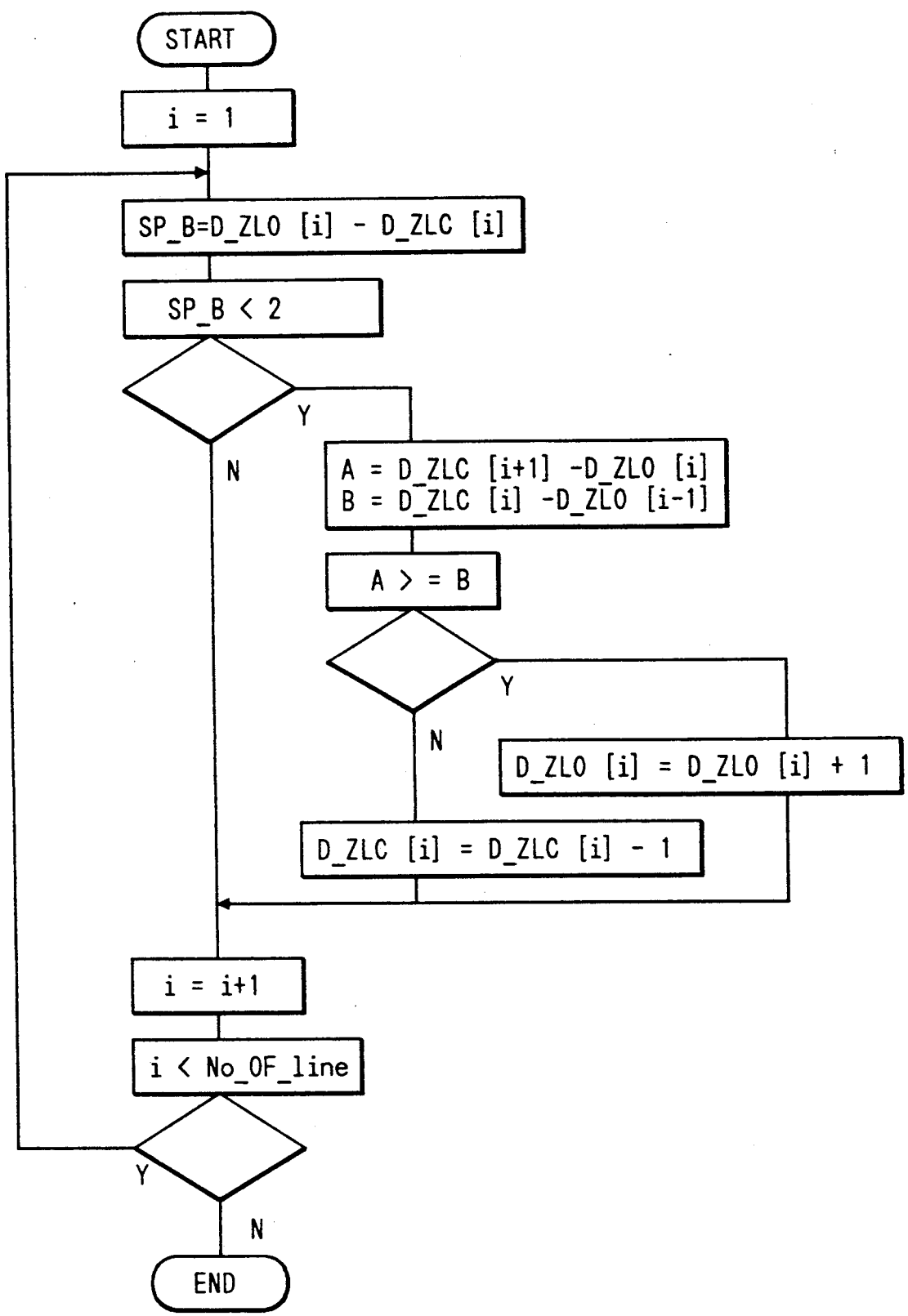
FIG. 20 is a flow chart which illustrates a process of calculations performed for allocating spaces.

The calculation (processing of configuration D_ZLO [0: No_of_Line−1] for the result of the calculation) of the reference line segment value and calculation (processing of configuration D_ZLC [0: No_of_Line−1] for the result of the calculation) of the relative line segment value are performed similarly to the case where PIX_SIZE is sufficiently large with respect to MINPIX. Then, the following space allocation adjustment process is added. Space Allocation Adjustment Process FIG. 20 is a flow chart about a process of calculating the space allocation adjustment. Then, description will be made with reference to FIG. 20.

As for i which meets i=1 to No_of_Line−1, the value of SP_B=D_ZLO [i]−D_ZLC [i]is checked. If SP_B <2, the adjustment is performed by the following calculations:

A comparison is made between A and B, where

A=D_ZLC [i+1]−D_ZLO [i]

B=D_ZLC [i]−D_ZLO [i−1]

If A>=B,

D_ZLO [i]=D_ZLO [i]+1

If A<B,

D_ZLC [i]=D_ZLC [i]−1

The above-described calculation for the adjustment may be replaced by the following method:

D_ZLO [i]=D_ZLO [i]+1 or

D_ZLC [i]=D_ZLC [i]−1 or

Dot Development

The output resolution coincidence control point thus processed is then input to the dot development circuit. It is preferable that the dot development circuit comprises, as described above, a simple dot solid circuit. It acts in such a manner that the bit map region is first initialized (all of the bits are turned off) before an outline along the output resolution coincidence control points is generated. Then, the dot development is performed by turning on all of the bits in a region from a bit, which has been turned on, to the next bit which has been turned on the bit map.

Transference to Output Device

Data, which has been dot-developed, is transferred to either of the frame buffers 21 shown in FIG. 21 so as to be output to an output device specified with the above-described input parameter, the frame buffers 21 being connected to the output device.

As described above, when information about the coordinate of a closed outline prepared as standard graphic information and outline information for distinguishing a plurality of closed outlines included in the graphic are enlarged or contracted by calculations in accordance with the specified output size before they are converted into dot information, and then dot information is converted into character data for a bit map for use in a character processing apparatus for outputting data, the following means are provided:

means for discriminating an exterior outline and an interior outline;
means for extracting a horizontal line and a vertical line;
means for determining a segment pair of the horizontal line and the vertical line after classifying them;
classifying means;
means for setting a horizontal and vertical space regions; and
means for setting a skipping order at the time of a low pixel, wherein a conversion to character data for a bit map development is performed which is composed of
the coordinate of the control point for expressing the outline of the subject character,
outline information for distinguishing the plurality of the closed outlines,
band information,
information about the control point for making a reference to the band information and
information about the coordinate value of the control point which is not included in the band information. As a result, character data for a bit map development which can be output with a wide range of font sizes and maintaining a high quality can be efficiently obtained.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A character processing apparatus having means for performing each of the following functions:
   recognizing coordinate information expressing a character, an exterior outline, an interior outline, a horizontal line and a vertical line;
   classifying the coordinate information expressing the character, the exterior outline, the interior outline, the horizontal line and the vertical line, and then determining band information in accordance with said classifying;
   setting a skipping order at the time of a low pixel so as to be converted into character data for a bit map development composed of a control point coordinate for expressing the outline of the character on the basis of the determined band information.

2. A character processing method comprising the steps of:
   recognizing coordinate information expressing a character, an exterior outline, an interior outline, a horizontal line and a vertical line;
   classifying the coordinate information expressing the character, the exterior outline, the interior outline, the horizontal line and the vertical line, and then determining band information in accordance with the classifying performed in said classifying step;
   setting a skipping order at the time of a low pixel so as to be converted into character data for a bit map development composed of a control point coordinate for expressing the outline of the character on the basis of the determined band information.

* * * * *

UNITED STATES PATENT AND TRADEMARK OFFICE
CERTIFICATE OF CORRECTION

PATENT NO. : 5,304,988
DATED : April 19, 1994
INVENTOR(S) : KUNIO SETO

It is certified that error appears in the above-indentified patent and that said Letters Patent is hereby corrected as shown below:

IN THE DRAWINGS

Figure 11B:
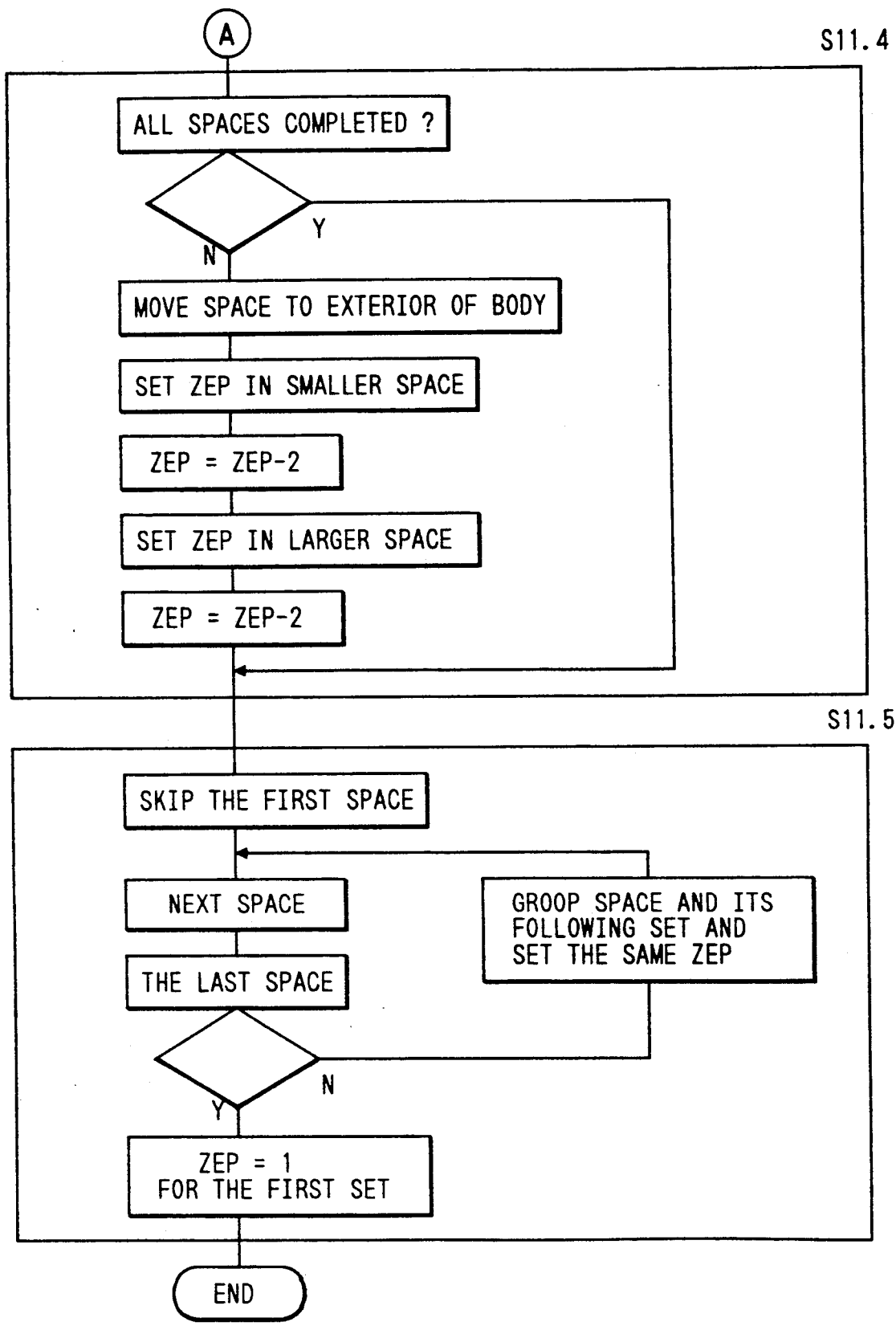

Sheet 17 of 35, FIG. 11B, "GROOP" should read --GROUP--.

COLUMN 2

Line 5, "inch" should read --inch,--.

COLUMN 3

Line 27, "describe" should read --described--.
Line 36, "pseudo enlargement" should read --pseudo-enlargement--.
Line 37, "traction-are" should read --traction are--.
Line 56, "at" should be deleted.

COLUMN 4

Line 23, "be" should be deleted.
Line 37, "6B" should read --6B,--
Line 52, "FIGS. 12" should read --FIGS. 12A--.

COLUMN 5

Line 56, "CRT1 CRT2," should read --CRT1 and CRT2, and--.
Line 68, "which," should read --which--.

COLUMN 6

Line 45, "a" (second occurrence) should be deleted.
Line 52, "origin 0" should read --origin O--.

UNITED STATES PATENT AND TRADEMARK OFFICE
CERTIFICATE OF CORRECTION

PATENT NO. : 5,304,988
DATED : April 19, 1994
INVENTOR(S) : KUNIO SETO

It is certified that error appears in the above-indentified patent and that said Letters Patent is hereby corrected as shown below:

COLUMN 6

Line 61, "arbitrary" should read --arbitrarily-- and "suit to" should read --suit--.
Line 68, "autumn)" should read --"autumn")--.

COLUMN 7

Line 17, "to" should be deleted.
Line 51, "fac," should read --face,--.
Line 63, "Outline" should read --¶ Outline--.

COLUMN 8

Line 10, "has" should read --have--.
Line 12, "convenient" should read --convenience--.
Line 65, "Reading" should read --¶ Reading--.

COLUMN 9

Line 8, "loops" should read --loops,-- and ""black"" should read --"black",--.
Line 24, "belongs" should read --belonging--.

COLUMN 10

Line 52, "portions" should read --portion--.

COLUMN 11

Line 3, "process" should read --processes--.
Line 15, "Process" should read --¶ Process--.

UNITED STATES PATENT AND TRADEMARK OFFICE
CERTIFICATE OF CORRECTION

PATENT NO. : 5,304,988
DATED : April 19, 1994
INVENTOR(S) : KUNIO SETO

It is certified that error appears in the above-indentified patent and that said Letters Patent is hereby corrected as shown below:

COLUMN 12

Line 3, "corresponds" should read --correspond--.

COLUMN 13

Line 11, "ba" should read --band 0,--.
Line 50, "character "    "" should read --character " 植 "--.
Line 54, "zsp2," should read --zsp2, zsp3,--.

COLUMN 14

Line 52, "Con-" should be deleted.
Line 53, "cept" should read --¶ Concept--.
Line 59, "There" should read --There are--.

COLUMN 15

Line 2, "pixels." should read --pixel.--.
Line 14, "case" should read --case of a--.

COLUMN 16

Line 65, "segment" should read --segments--.

COLUMN 17

Line 40, "structure" should read --structured--.

UNITED STATES PATENT AND TRADEMARK OFFICE
CERTIFICATE OF CORRECTION

PATENT NO. : 5,304,988
DATED : April 19, 1994
INVENTOR(S) : KUNIO SETO

It is certified that error appears in the above-indentified patent and that said Letters Patent is hereby corrected as shown below:

COLUMN 18

Line 8, "made" should read --made to--.
Line 14, "CvC." should read --CVC.--.

COLUMN 19

Line 5, "ad" should read --as--.
Line 35, "made" should read --made to--.

COLUMN 20

Line 15, "18" should read --17--.

COLUMN 21

Line 24, "a" should read --an--.
Line 26, "made" should read --made to--.

COLUMN 22

Line 50, "now" should be deleted.

COLUMN 23

Line 49, "configuration" should read --configurations--.

COLUMN 24

Line 7, "with case" should read --with reference to a case--.
Line 37, "D_CORD[i]=[BAND_NO]." should read
--D_CORD[i]=BAND[BAND_NO].--.

UNITED STATES PATENT AND TRADEMARK OFFICE
CERTIFICATE OF CORRECTION

PATENT NO. : 5,304,988
DATED : April 19, 1994
INVENTOR(S) : KUNIO SETO

It is certified that error appears in the above-indentified patent and that said Letters Patent is hereby corrected as shown below:

COLUMN 24

Line 45, "case" should read --case where--.
Line 56, "Space" should read --¶ Space--.

COLUMN 25

Line 15, "or" should be deleted.

COLUMN 26

Line 35, "classifying;" should read --classifying; and--.
Line 50, "step;" should read --step; and--.

Signed and Sealed this

Twenty-fifth Day of October, 1994

Attest:

BRUCE LEHMAN

*Attesting Officer*   *Commissioner of Patents and Trademarks*